United States Patent
Harvey et al.

(10) Patent No.: US 7,054,924 B1
(45) Date of Patent: May 30, 2006

(54) METHOD AND APPARATUS FOR PROVISIONING NETWORK DEVICES USING INSTRUCTIONS IN EXTENSIBLE MARKUP LANGUAGE

(75) Inventors: Andrew Harvey, Pleasanton, CA (US); Ikramullah Mohammad, Santa Clara, CA (US); Leo Pereira, Fremont, CA (US); Tohru Kao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 673 days.

(21) Appl. No.: 09/675,921

(22) Filed: Sep. 29, 2000

(51) Int. Cl.
*G06F 15/16* (2006.01)
*G06F 15/177* (2006.01)

(52) U.S. Cl. ............ 709/220; 709/203; 709/219; 709/221

(58) Field of Classification Search ........ 709/220–222, 709/226–229, 202–203, 223–224, 206; 370/519; 707/10
See application file for complete search history.

(56) References Cited

U.S. PATENT DOCUMENTS

| | | | |
|---|---|---|---|
| 5,404,321 A * | 4/1995 | Mattox .................... 715/781 |
| 5,513,126 A * | 4/1996 | Harkins et al. ............ 709/228 |
| 5,761,662 A * | 6/1998 | Dasan ..................... 707/10 |
| 5,790,789 A * | 8/1998 | Suarez .................... 709/202 |
| 5,832,503 A * | 11/1998 | Malik et al. ............. 709/223 |
| 5,991,828 A | 11/1999 | Horie et al. |
| 6,185,612 B1 * | 2/2001 | Jensen et al. ............ 709/223 |
| 6,195,694 B1 * | 2/2001 | Chen et al. .............. 709/220 |
| 6,250,309 B1 * | 6/2001 | Krichen et al. .......... 128/899 |
| 6,370,163 B1 * | 4/2002 | Shaffer et al. ........... 370/519 |
| 6,374,207 B1 * | 4/2002 | Li et al. .................. 709/203 |
| 6,513,047 B1 * | 1/2003 | Talley ..................... 707/200 |
| 6,519,617 B1 * | 2/2003 | Wanderski et al. |
| 6,553,403 B1 * | 4/2003 | Jarriel et al. ............ 709/202 |
| 6,567,837 B1 * | 5/2003 | Robinson .................. 718/1 |
| 6,571,201 B1 * | 5/2003 | Royal et al. |

(Continued)

OTHER PUBLICATIONS

Tittel, Ed et al.; XML for Dummies; Apr. 2000; Wiley Publishing; 2nd Edition; pp. 14, 18, and 77.*

(Continued)

*Primary Examiner*—Rupal Dharia
*Assistant Examiner*—Quang N. Nguyen
(74) *Attorney, Agent, or Firm*—Hickman Palermo Troung & Becker, LLP

(57) ABSTRACT

A method is disclosed for carrying out network device provisioning and configuration, and communication of other information to a network device, automatically and in an assured manner. A configuration service receives a request from a network device to provide configuration information. The configuration service retrieves a template representing the configuration from a storage location, e.g., a directory service. The configuration service also retrieves one or more parameter values specific to the device. Device-specific values are instantiated for the generic parameters in the template, based on the retrieved values. The resulting configuration is stored in XML format using XML tags to delimit configuration commands, tested for well-formedness, and syntax checked. A reliable transport protocol carries the configuration information to the device. At the device, a configuration agent syntax checks the embedded configuration information, and then applies the configuration information to the device. As a result, automatic network provisioning may be accomplished remotely, without requiring a skilled technician to visit customer premises to carry out configuration. The process may be integrated with an event service to enable multiple devices to concurrently receive re-configuration without special synchronization logic.

32 Claims, 10 Drawing Sheets

U.S. PATENT DOCUMENTS

| | | | |
|---|---|---|---|
| 6,574,663 B1 * | 6/2003 | Bakshi et al. | 709/223 |
| 6,594,757 B1 * | 7/2003 | Martinez | 713/2 |
| 6,775,701 B1 * | 8/2004 | Pan et al. | 709/226 |
| 2001/0034771 A1 | 10/2001 | Hutsch et al. | |
| 2002/0129132 A1 | 9/2002 | Sato | |
| 2003/0074430 A1 | 4/2003 | Gieseke et al. | |

OTHER PUBLICATIONS

XML.org, The XML Industry Portal, www.xml.org, printed Jan. 23, 2001.

Cisco Connection Online, www.cisco.com, printed Jan. 23, 2001.

Cisco—Cisco IOS Software—Overview, printed Jan. 23, 2001.

K. Vadenais, "The IP Services Game," XChange Magazine, allegedly posted Mar. 15, 2000.

Ceon NetExpress Server, Ceon Corporation, www.ceon.com, printed Jan. 23, 2001.

SmartPipes Supported IP Services Devices, www.smartpipes.com, printed Jan. 23, 2001.

K. Downes et al., Network Management Basics, Cisco Internetworking Technologies Handbook ($2^{nd}$ ed. 1998), Chap. 6, pp. 77-83.

E. Harold, "XML: Extensible Markup Language" (Foster City, Calif.: IDG Books Worldwide, Inc., 1998), Chap. 1, pp. 3-22.

* cited by examiner

METHOD AND APPARATUS FOR PROVISIONING NETWORK DEVICES USING INSTRUCTIONS IN EXTENSIBLE MARKUP LANGUAGE

FIELD OF INVENTION

The present invention generally relates to configuration and management of computer network devices. The invention relates more specifically to a method and apparatus for provisioning network devices using instructions in Extensible Markup Language.

BACKGROUND OF THE INVENTION

Internet Service Providers (ISPs) are in the business of selling connections to public data networks to individual and enterprise end users. In the ISP industry, the complexity of the configuration of IP networks is steadily increasing, due to the need to support a variety of applications each having its own specialized needs, based on business policy and quality of service ("QoS") considerations. The typical new network is less concerned with bandwidth and more concerned with QoS. If there is contention for resources, the intelligent network will allocate resources based on the business policy of the enterprise.

In the course of working with a new customer, an ISP may install and configure one or more network devices at the customer premises ("customer premises equipment" or "CPE") for the purpose of linking the customer's internal networks with the ISP and from there to external, public networks such as the Internet. Often the links between the CPE devices and the ISP use Internet Protocol (IP) for communications. The CPE devices require software configuration after installation in order to operate correctly.

Currently, configuration procedures are mostly manual, especially for multi-site networks (as opposed to single site configurations). Often standard procedures do not exist or are not followed to the letter. As volumes of smaller, more standardized, customer networks are fast increasing, the demands on operational groups, availability of skills and costs are becoming untenable. And, the integration costs are also increasing. Hence, there is a need to standardize the process as well as technology used for provisioning and integration in the ISP industry.

In a typical past approach, the CPE devices are configured manually. As an example of manual configuration, an ISP may send a CPE router to a customer site along with an experienced network technician who configures the box on-site. In the case of an ISP that also provides cable (line) installation service, the enterprise may send two different technicians to the customer site, one to install the line and a second to install the CPE router. Alternatively, the customer device is installed by a less-skilled individual, and configured by Telnet connection using one or more command-line interface ("CLI") commands.

Since sending a skilled technician to a customer site may cost several hundred dollars, and since a skilled technician can only visit and work at a few customer sites per day, there is a need for a way to increase the number of possible installs-per-day, to eliminate a technician visit in the installation process, or to reduce the required skill set and cost of the on-site technician.

Still another problem of the current approach is that use of Telnet to send configuration commands introduces undesirable failure modes. For example, if a Telnet connection is opened, and a technician needs to send 15 CLI commands to the device, but the connection drops unexpectedly after only 8 commands are sent, the device may enter an undefined state, exhibit errors, receive inconsistent instructions or otherwise become unusable.

In another approach, the COPS protocol under consideration by IETF, RCP file transfer, or other protocols may be used to configure certain features of a device. However, the COPS protocol does not enable configuration of all features of a device that are available using the native command language of the device; it focuses on quality of service (QoS) features. Similarly, while SNMP may be used to configure selected device features and parameters, it also cannot address all features that are available in the native command language. There is a need for a way to remotely provision a device with access to all available features of the device.

Moreover, for certain businesses and institutions, there is a need for a means to send a partial configuration to the network element to configure the network element for new services.

Based on the foregoing, there is also a clear need for an improved method of delivering provisioning and configuration information to devices in the field.

There is also a need for a way to describe a network device configuration in a way that facilitates re-use in connection with one or more network devices of the same type.

There is a further need for a way to provision a network device remotely and reliably without reliance on Telnet transmissions.

SUMMARY OF THE INVENTION

The foregoing needs, and other needs and objects that will become apparent for the following description, are achieved in the present invention, which comprises, in one aspect, a method for carrying out network device provisioning and configuration, and communication of other information to a network device, automatically and in an assured manner.

In one aspect, the invention provides a method of automatically configuring a network device. The method comprises the computer-implemented steps, including receiving a request from the network device to provide configuration information. A template describing a device configuration is retrieved, and the template comprises zero or more parameters that may be resolved into values specific to a particular device. Zero or more values of parameters specific to the device are received. A device-specific instance of the configuration information is created and stored, based on the template and the values of parameters and conforming to an Extensible Markup Language Document Type Definition (XML DTD), comprising one or more XML tags that delimit the configuration information.

In one specific embodiment, a configuration service receives a request from a network device to provide configuration information. The configuration service retrieves a template representing the configuration from a storage location, e.g., a directory service. The configuration service also retrieves one or more parameter values specific to the device. Device-specific values are instantiated for the generic parameters in the template, based on the retrieved values. The resulting configuration is stored in XML format using XML tags to delimit configuration commands. A reliable transport carries the configuration information to the device. At the device, a configuration agent syntax checks the embedded configuration information, and then applies the configuration information to the device. As a result, automatic network provisioning may be accomplished, without requiring a skilled technician to visit customer premises to carry out configuration. The process may be integrated with an event service to enable multiple devices to concurrently receive re-configuration without special synchronization logic.

In other aspects, the invention encompasses a computer apparatus, a computer readable medium, and a carrier wave configured to carry out the foregoing steps. Other aspects and features will become apparent from the following description and the appended claims. Further, alternative embodiments are applicable to automatic configuration of computer program applications, rather than network devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for provisioning network devices using instructions in Extensible Markup Language ("XML") is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW OF PROVISIONING SYSTEM

According to an embodiment, XML-based device provisioning enables a network engineer, administrator/planner or user to provision/design a network system using configuration information that is formatted using XML and delivered to a device using Hypertext Transfer Protocol (HTTP), Active Server Pages (ASPs) or Java® servlets, and technologies based on open standards. The administrator/planner creates one or more common configuration templates, which can contain Universal Resource Locators (URLs) that identify the location of the device information, which is stored in a repository. Using such templates, an individual device configuration is dynamically built utilizing information located in the repository. The repository may be, for example, a directory or database. This enables templates to be used for multiple devices. Use of XML enables use of the configuration service and agent with any device that can accept and process character data. XML based provisioning places very few constraints on the target devices. The only requirement is that the platform can process 7-bit character data, which virtually all computer devices can process. There is no dependency on esoteric network properties such as byte order, etc.

In this configuration, one or more network devices each execute or run a Configuration Agent that can parse XML data and convert the XML data into the native interface for the device. For example, one or more Command Line Interface (CLI) commands are used to re-configure the device. The network device may also execute an Event Agent that the configuration agent can utilize for sending events containing messages or data in XML format. The Event Agent and Configuration Agent utilize the services of other infrastructure components, e.g., a directory and an event services manager. This arrangement enables setting up a "plug and play" network that is designed for savings in installation and configuration and for reducing the time to commission networks.

Figure 1:
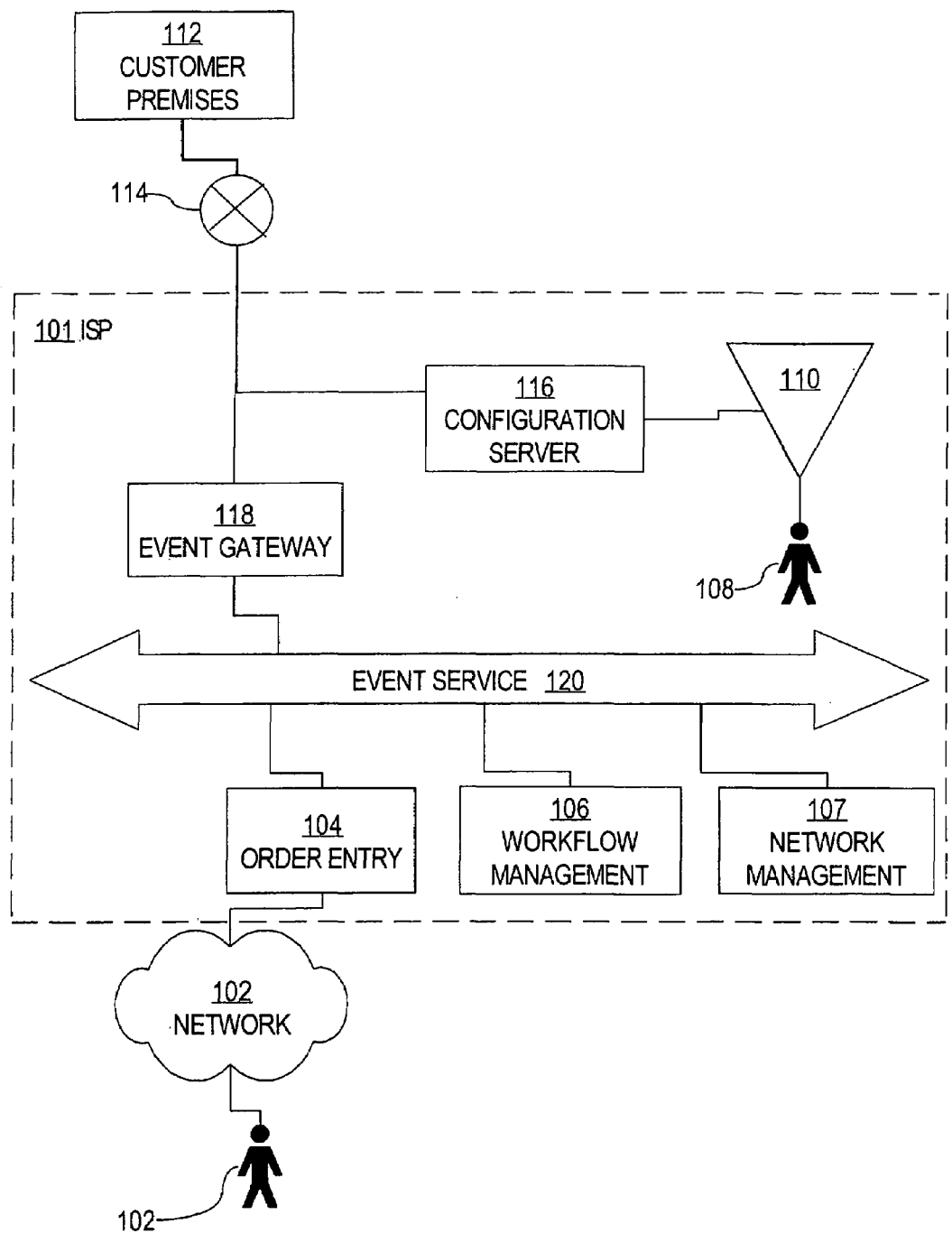
FIG. 1 is a simplified block diagram that illustrates an overview of a network device provisioning system.

FIG. 1 is a block diagram of an example embodiment of a network device provisioning system. A customer 100 is associated with customer premises 112. In this context, customer 100 may comprise a direct representative of a customer or end user, such as an employee, or an indirect representative of the customer or end user, such as a telephone company, Internet Service Provider, or other agent acting on behalf of the ultimate customer or end user.

Customer 100 has a workstation that is communicatively coupled to a public data network 102, which may be a local area network, wide area network, one or more internetworks, the global packet-switched data network known as the Internet, etc. The customer receives Internet or other network services from an ISP 101.

Within ISP 101, an order entry system 104 is coupled to network 102. The order entry system 104 receives one or more orders and can communicate over an event service 120 with a workflow manager 106. A network engineer 108, or a network administrator or planner, is responsible for configuring the device and can store all necessary information about the device in a Directory 110. Alternatively, order entry system 104 may be independent of network 102, and data collected by the order entry system 104 may be periodically delivered to event service or workflow manager 106, as by batch processing, EDI, etc.

The network device 114 is installed at the customer premises 112. The device 114 may connect directly or indirectly through one or more networks to a Configuration Server 116. The device 114 can obtain configuration information from the Configuration Server 116 that utilizes the directory 110 to retrieve the device specific information. When configuration is completed, the device 114 can generate a status event to the event service 120 through Event Gateway 118. Preferably, the link between Event Gateway 118 and device 114 uses TCP or another reliable transport, however, non-reliable transports may be used for all other links shown in FIG. 1. In addition, the system may generate other events upon successful configuration, such as events relating to billing, order acknowledgment, etc.

Notifications and other messages communicated among the order entry system 104, workflow manager 106, network management station 107, and Event Gateway 118 pass through Event Service 120. In one specific embodiment, Event Service 120 is implemented in the form of The Information Bus software, which is commercially available from TIBCO Software, Inc. Event Gateway 118 provides as an interface that permits network devices 114 to communicate with Event Service 120.

In FIG. 1, for purposes of illustrating a simple example, only one customer, customer premises, and network device 114 are shown. However, in a practical system, there may be any number of such elements. Also, there may be multiple replicated instances of Configuration Server 116, Event Gateway 118, etc.

Figure 2:
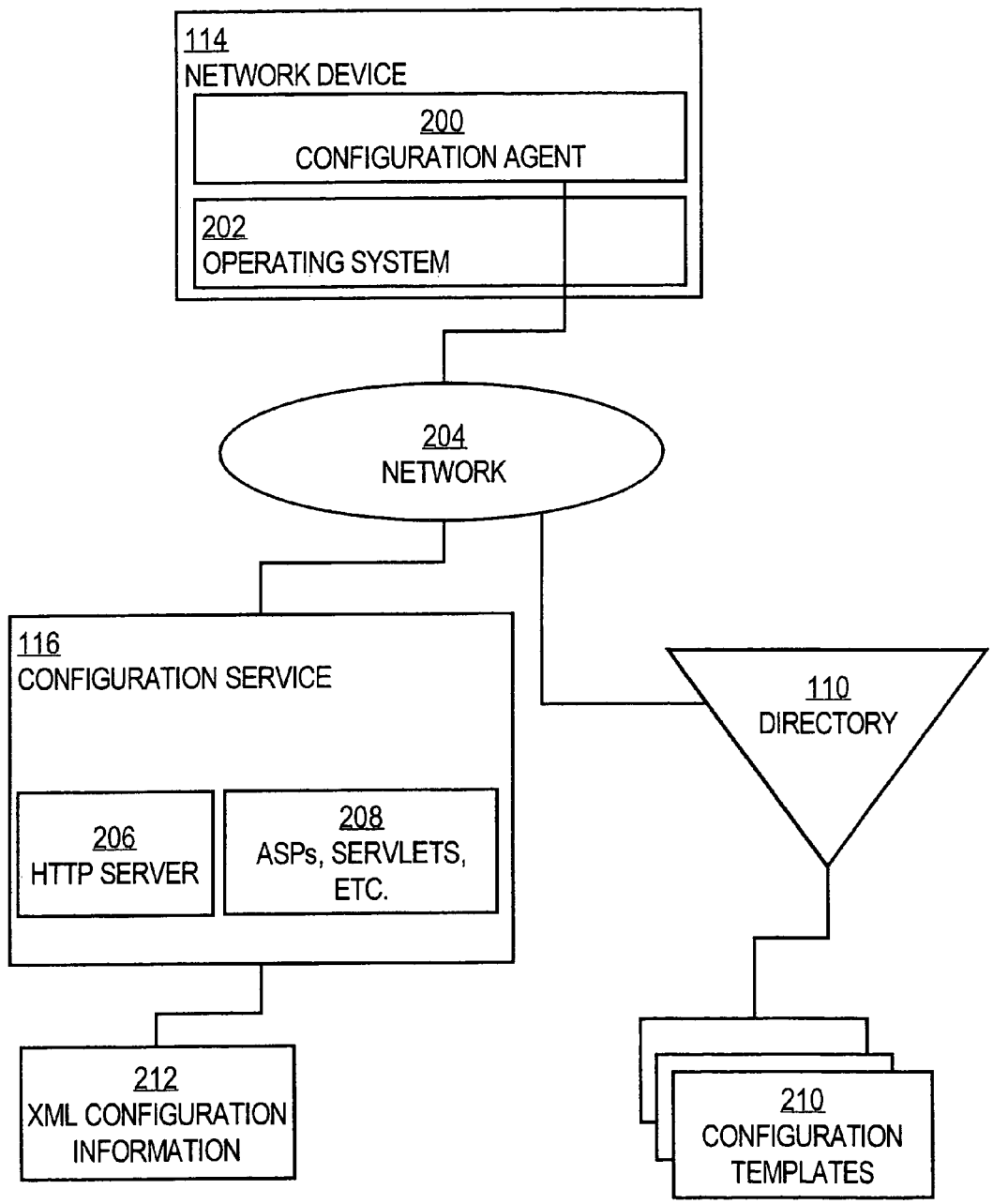
FIG. 2 is a simplified block diagram that illustrates internal elements of a network device and a configuration service.

FIG. 2 is a simplified block diagram illustrating internal elements of network device 114 and Configuration Server 116.

Network device 114 operates under control of an operating system 202. In one specific embodiment, operating system 202 is the Internetwork Operating System ("IOS") of Cisco Systems, Inc. Network device 114 also executes a Configuration Agent 200, which is supervised by operating system 202, and which has functions and structures that are described further herein. Network device 114 may also execute one or more other agents, application programs, etc., such as an SNMP agent, TCP/IP agent, etc. In one specific embodiment, network device 114 is a router device of the type available from Cisco Systems, Inc.

Network device 114 is communicatively coupled to network 204. Configuration Server 116 and Directory 110 are logically separate from network device 114, and also are communicatively coupled to network 204.

Configuration Server 116 comprises one or more software elements that cooperate to carry out the functions described further herein and that have the structures that are described further herein. In one embodiment, Configuration Server 116 comprises a Web server 206 and one or more ASPs, Java® servlets, etc., represented by block 208, that cooperate with the Web server. The specific implementation structures that are used for block 208 are not critical, provided they carry out the functions described herein, in the manner as described or in a functionally equivalent manner. In one specific embodiment, one or more ASP pages or Java® servlets for handling configuration requests and monitoring are installed in appropriate places in the document directory of Web server 206.

Configuration Server 116 is communicatively coupled to one or more configuration templates 210, the functions of which are described further herein. Configuration templates 210 each comprise a set of stored data that defines a configuration of a network device in terms of one or more CLI commands and zero or more modifiable parameters. The templates may be stored in the form of one or more text files, database records, directory entries, etc. In one specific embodiment, all the configuration template files are stored on Web server 206 and are placed relative to the document root of such server.

Directory 110 is communicatively coupled to network 204 and is thereby accessible by Configuration Server 116. In one embodiment, Directory 110 is a directory service that is compatible with Lightweight Directory Access Protocol (LDAP), JNDI, or an equivalent directory access protocol, e.g., Microsoft Active Directory.

In one specific embodiment, operating system 202 is IOS Version 12.1.5T of Cisco Systems, Inc.; Configuration Server 116 operates under control of an operating system such as Windows 2000 or Unix, e.g., Sun Microsystems' Solaris operating system version 2.6. Examples of Web server 206 are Microsoft Internet Information Server on Windows 2000, or the Apache Web server on Unix. A Java® Servlet Engine such as JRun may control operation of servlets of Configuration Server 116.

In this configuration, configuration information in Directory 110 may be used by other applications that are not directly related to device provisioning, e.g., workflow management, and others. Further, Telnet is not required; instead, HTTP serves as the transport mechanism. A "payload" of configuration information is separated from the transport mechanism and presented in a plain character text format that is independent of the transport mechanism, enhancing scalability and adaptability to devices that function with standard protocols.

FUNCTIONAL OVERVIEW OF CONFIGURATION AGENT

Configuration Agent 200 may be used for initial or complete configuration of a network device 114, and for partial configuration of the device.

—Initial Configuration

Referring again to FIG. 1, for the purposes of illustrating an example of use of an embodiment for initial configuration, assume that customer 100 places an order for network service with ISP 101 by using a client computer that connects over network 102 to order entry system 104. In an embodiment, the client computer uses an HTML browser program to connect to the order entry system, which hosts a Web server. Customer 100 signs up for a service that involves ordering a network device, such as a router, and installation of a particular kind of network cabling or wiring (e.g., ISDN, Frame Relay, etc.). The order entry system 104 accepts the order and notifies a workflow manager 106 of the order. The workflow manager 106 initiates one or more orders to prepare the physical equipment, based on one or more business rules. As a result, an order for shipment of a network device 114 is generated and a physical line is ordered.

Meanwhile, the workflow manager 106 generates a request to a network engineering department to have the network device 114 configured. A network engineer 108 who is responsible for configuring the device creates and stores any additional information relevant to the device 114 in Directory 110.

The network device 114 arrives at the customer premises 112. A cable installer visits the customer premises 112, installs cable and plugs in the network device 114. The cable installer does not have any expert knowledge of the network device 114. The device 114 is preprogrammed with or discovers a token that uniquely identifies itself, e.g., a router hostname or MAC address. Upon power up, the device 114 establishes a connection to Configuration Server 116. The device 114 identifies itself, using the token, to the server and requests the configuration information that is held in Directory 110 for the device.

In response, the Directory 110 provides a reference to configuration information specific to the device 114. For example, in one embodiment, Directory 110 provides a pathname of a device-specific configuration file that is stored in the file system of Configuration Server 116. Configuration Server 116 then provides the configuration file to the device 114.

Upon receipt of a configuration file for the device 114 from the Configuration Server 116, the device validates the configuration file by doing a syntax check. In this context, a "syntax check" may involve one or more separate checks, including a check of whether the template is well-formed; validation of the configuration file; and a syntax check of one or more native commands that are contained in the configuration file. If the syntax check is successful, then the device 114 applies the configuration information and writes it to persistent storage within the device.

Once configuration has completed successfully, the device 114 generates and sends a success event to event service 120 through Event Gateway 118. This event may be monitored by a network management workstation 107 and workflow manager 106. When the network management workstation 107 receives the successful event, it automatically starts monitoring the device 114. Similarly, the workflow manager 106 takes appropriate actions as a result of the successful event. If a failure occurred an event is also generated containing the relevant information to assist in resolution of the problem either manually or programmatically. Applications and/or users register their interest in these events and take the appropriate actions when they occur.

In complete configuration, each device 114 is assumed to have a pre-loaded, minimal configuration that is sufficient to enable the device to establish TCP/IP connectivity, so that the Configuration Agent 200 can communicate over network 204 with Configuration Server 116 using TCP/IP. For example, it is assumed that the minimal configuration of the device causes the device to look for its initial configuration from a Web server using a CLI command of the type described further herein. TCP/IP connection may be accomplished using an IOS agent. The manner in which this configuration is actually loaded is domain specific. This could involve mechanisms that are static (e.g., Config Express) or dynamic in nature using media specific information, e.g. the wire pair in DSL or the frequency in a cable network.

When the device 114 is powered-up at customer premises 112, the device connects to Configuration Server 116 by establishing a TCP/IP connection. The device issues an HTTP get request to Web server 206 of Configuration Server 116. To uniquely identify itself to the Configuration Server 116 and to the Web server, the device 114 provides its token as a unique identifier.

In response, based on the device's unique identifier, Configuration Server 116 retrieves one of the configuration templates 210 that is associated with the device 114. The retrieved template is parameterized. Parameter values are resolved by retrieving specific values from Directory 110, or another repository, that correspond to the parameters. As a result, a stream or file of XML format configuration information is created and potentially stored. The XML information comprises one or more XML tags and attributes that contain one or more CLI commands that represent a new device configuration. Each element of general device configuration information is embedded in a <config> XML tag and each device CLI command is embedded in a <cli> XML tag. The specific tags set forth herein are not required; functionally equivalent tags having different names may be used.

Configuration Server 116 then checks whether the XML configuration information is valid in comparison to a specified Document Type Definition (DTD) that defines a grammar with which the XML configuration information must conform. This task may be carried out using a conventional XML parser, or an XML validation parser, of which several are commercially available. Such checking may also involve testing whether the XML configuration information constitutes well-formed XML text, and syntactically correct XML text. Determination of whether the XML information is well-formed may involve comparing the configuration information to the DTD, determining whether all opening tags have corresponding closing tags such that there is no nesting, etc. If the XML is not well-formed, an error is generated. Syntax checking at this stage involves checking the syntax of the XML text, without determining whether CLI strings contained within XML tags of the XML text constitute syntactically correct CLI commands.

In this configuration, carrying out the checks of well-formed-ness and syntactic correctness before deployment of the configuration information is useful in placing the burden of a potentially intensive computation load on the Configuration Server 116, rather than the device 114. Further, the DTD of the XML information may be stored at Configuration Server 116 rather than on device 114, which may have limited memory.

Web server 206 delivers XML encoded configuration information from the server to the Configuration Agent 200 of the device 114 in an HTTP response.

In response, Configuration Agent 200 carries out a parsing and checking process on the received XML configuration information. The Configuration Agent 200 parses the XML configuration information and determines whether the XML information is well-formed. With HTTP carried over TCP, message streams are reliable but there are no message boundaries. However, the XML configuration information may include beginning and ending tags that delimit the configuration information. By checking for the presence of the beginning and ending tags, Configuration Agent 200 can verify that it has received all the XML configuration information. In one embodiment, if an incomplete stream is received, a parser element of Configuration Agent 200 determines that the XML configuration information is not well formed, and throws an error.

Configuration Agent 200 then carries out a CLI syntax check on the configuration information to determine whether the CLI strings embedded in the XML text represent syntactically proper CLI commands. In one embodiment, XML tags identifying CLI strings are removed from the XML configuration information, and the remaining information (each line of which constitutes a CLI command string) is applied to a CLI parser function within operating system 202. Such syntax checking may involve reporting any CLI syntax errors that are found. If the device 114 is configured for events using event service 120, then Configuration Agent 200 reports the errors as events to Event Service 120, otherwise it generates a message to the system log of the device.

In prior network devices that have the IOS operating system, operating system 202 parses and carries out a syntax check of each CLI command that it receives, and then immediately executes each parsed command if no syntax error is found. Separating the parsing function from the execution function of such an operating system is one way to implement the CLI parser function that is described above.

If there are no syntactic errors, then Configuration Agent 200 applies the configuration information by calling one or more action routines of operating system 202 to carry out each command that is included in the configuration information. Action routines may be specified in the XML configuration information using opening and closing tags that identify an action routine that is delimited by the tags. Alternatively, action routines may be implied based on the name of a particular CLI command. If application of the configuration information is successful, Configuration Agent 200 removes the CLI command that signifies that the information is for an initial configuration, and writes the remainder of the configuration information to NVRAM of the device. On successful completion of the configuration, Configuration Agent 200 sends out a completion event if it is configured to use events, or writes a completion message to the system log.

If the syntax check succeeds, but a semantic error is detected, Configuration Agent 200 may capture the output of operating system 202 that reports the error and generate a "configuration error event" to event service 120. An example of a semantic error is a duplicate IP address in an entry of Directory 110. One or more applications that monitor devices can subscribe to such error events, and take appropriate actions in response. For example, workflow manager 106 may subscribe to any error events that are generated. It can then notify the appropriate entities that manual intervention is required to resolve configuration problems.

—Partial Configuration

Referring again to FIG. 1 as an example, once a device 114 is operational, incremental configuration information can be sent to the device. In one embodiment, Configuration Agent 200 can carry out partial configuration or incremental configuration updates. In the case of partial configuration, Configuration Agent 200 can operate in either a push mode or a pull mode.

In push mode, configuration data can be pushed to the device 114 in the form of an event. For example, device 114 subscribes to a configuration announcement event that is managed by event service 120. In this arrangement, XML format configuration information is sent as a payload of an event using the Event Gateway 118. Push mode may be used to send identical configuration information to multiple devices, akin to a broadcast.

In pull mode, Configuration Agent 200 pulls event information from a Web server using an HTTP GET request on receipt of the event. For example, a signal event is sent to trigger the device 114 to obtain an incremental configuration from Configuration Server 116. This may be used when, in response to a particular event, it is desirable to cause the device to load a new or updated configuration, or when identical information cannot be sent to multiple devices, e.g., due to differences in the content of the information.

As in the case of an initial configuration, the device 114 can optionally check the syntax of the configuration before applying it. If successful, the device 114 applies the incremental configuration and optionally writes it to NVRAM. Once the incremental configuration is applied, Configuration Agent 200 generates an event on success or failure of the configuration, and sends the event through Event Gateway 118 to event service 120.

—Synchronization for Single Partial Configuration

Separation of syntax checking from application of a configuration, and use of event services in the disclosed embodiments overcomes problems of prior approaches relating to coordination of configuration of multiple network devices. For example, in one prior approach, setting up a virtual private network (VPN) using IP security (IPSec) protocols is difficult because of the need to coordinate re-configuration of multiple network devices that form the VPN. Where IPSec tunneling is used to create a VPN, tunnel endpoints must be set up at the same instant, or packets across the VPN may be lost. Accordingly, in the prior approaches, a configuration is established offline, and the configuration information is sent to all network devices involved in the VPN at precisely the same pre-determined time. However, this approach requires synchronization of the clocks of all involved devices and minimization of propagation delays. If one or more devices are unavailable at the appointed time, or receive the configuration out of synchronization, there may be instants when the VPN is in an anomalous state because devices in the VPN path are not properly configured, resulting in errors or dropped packets.

In contrast, with the event approach disclosed herein, each device may subscribe to a configuration event that signals a successful syntax check. The configuration information may be delivered to multiple devices without synchronization, e.g., as a payload of a configuration event that travels using Event Services 120. When the syntax check is successful, the event signaling such success is sent. In response, each subscribing device automatically applies the new configuration at the same time without the need for clock synchronization. As a result, this approach enables setting up VPNs, for example, without the problems of the prior approaches.

In one embodiment, when device 114 receives the configuration, it may choose to defer the application of the configuration upon receipt of a 'write signal' event. For example, a change in an Internet Protocol Security (IPSec) policy may be required to take effect on all tunnel endpoints at approximately the same time. The 'write signal' event may be used to trigger the application of such a change.

In another embodiment, when doing partial configuration the Configuration Agent 200 synchronizes the loading of the configuration on a group of devices in one of two ways. In one approach, partial configuration is initiated upon receipt of a load event. In another approach, an executive (exec) command line command is manually issued to cause a partial configuration to load.

In the first approach, synchronization is done using Event Service 120 and occurs only when initiated by the receipt of a load event. When the Configuration Agent 200 receives the load event it determines whether it should only read in the data, or also run a syntax check. Configuration Agent 200 also determines whether it should apply the configuration, by reading attributes in the XML data. If a read-only attribute is TRUE then it will read in the configuration information, carry out syntax checking and send a success or failure event to Event Service 120. As described further herein with respect to applicable XML DTDs, Configuration Agent 200 then waits for another load event with the action attribute of the config-write element set to "write", and then applies the configuration and send a success or failure event to Event Service 120 using the subject sync-status. If Configuration Agent 200 receives a load event with the action attribute of the config-write element set to "cancel," it will remove the configuration from its buffer.

Configuration Agent 200 uses the identifier field in the XML data to correlate the write or cancel action with the appropriate configuration in its buffer. If Configuration Agent 200 receives a write or cancel action with an identifier that it cannot correlate, then Configuration Agent 200 will generate a failure event.

—Synchronization for Multiple Partial Configurations

In one embodiment, the configuration agent carries out synchronization for multiple partial configurations. Specifically, the configuration agent keeps multiple partial configurations in its buffers and upon receiving a load event with a config-write element, the configuration agent can write or cancel the appropriate configuration based on the identifier.

—Security

In one embodiment, the configuration agent is as secure as the Telnet method of configuration that it replaces, since the server that it receives the configuration data from, is configured on the device and hence should be a trusted server. In an alternate embodiment, a separate security protocol may be negotiated as part of the process of connecting a device to a configuration server.

—Use of Other Transports

In another embodiment, the configuration agent has an application programming interface for partial configuration. Using the API, an IOS application can retrieve the configuration data by means other than an event or HTTP, and use the configuration agent to syntax check and apply the configuration. As a result, approaches disclosed herein are usable in heterogeneous domains that use different mechanisms to transport the XML configuration information.

—Automatically Locating a Configuration Server

In another embodiment, a location service is provided, whereby a device can automatically find the configuration server so that there will be minimal configuration needed.

—Management of Configuration Agent

In one embodiment, Configuration Agent 200 may be managed using the command line interface of the managed device. Specifically, in one embodiment, the configuration agent can respond to a CLI configuration command for receiving initial configuration information for the managed device. In one example embodiment, the configuration command is:

cns config initial <ipaddress> [event] [no-syntaxcheck] [page <webpage>]

where ipaddress represents the IP address of the web server, event indicates that the system shall send an event on completion or failure of the configuration, no-syntaxcheck means to turn off syntax checking, and page <webpage> means that a Web page, e.g., an active server page, shall be used to obtain the configuration.

In one specific embodiment, a CLI command of the following form may be used to turn on partial configuration in the IOS device:

cns config partial [<ipaddress>]

where ipaddress is the IP address of a server that implements Configuration Server 116. In one embodiment, the default IP address value is 0.0.0.0., which means the user must enter a value. In another embodiment, Configuration Agent 200 uses the location service to find the server if no address is specified. For security reasons, this is the only server to which Configuration Agent 200 will connect to get configuration information.

In another specific embodiment, operation of Configuration Agent 200 may be monitored and debugged by a CLI command of the form "debug cns config".

In yet another specific embodiment, an executive command of the following form may be used to receive the configuration information only if partial configuration is configured in the managed device:

cns get-config <webpage> [event] [no-syntaxcheck] where <webpage> is a Web page to use to retrieve the configuration; event means to send an event on completion or failure of the configuration; and no-syntaxcheck means to turn off syntax checking.

—Subject of Configuration Events

Event services such as The Information Bus of TIBCO Software, Inc., characterize events in terms of event "subjects." An event consumer, such as workflow manager 106, may subscribe to all events of a particular subject. Thus, hierarchies of events and subscriptions may be established. In one embodiment, Configuration Agent 200 uses the prefix "cisco.cns.config" for all the subjects that it subscribes for or posts to. Of course, any other prefix may be used that uniquely identifies events associated with Configuration Agent 200. In one specific embodiment, Configuration Agent 200 uses the following events:

"load"—The agent subscribes to this subject to get configuration events.

"complete"—The agent uses this subject to post successful completion of the configuration.

"failure"—The agent uses this subject to post configuration failures.

"sync-status"—If an application is using synchronized partial configuration, then the agent posts success or failure of the read and syntax check operation on this subject, so that the application can then complete the configuration load.

—Applicability to Functions Other Than Provisioning

Embodiments may carry out functions other than device provisioning or configuration. For example, the processes and structures disclosed herein may be used to deliver a security certificate or other information to a network device. In such an embodiment, the security certificate may be stored in XML text, delimited by appropriate tags that identify the certificate, and sent to the device as an event payload or by other means. Within the device, Configuration Agent 200 or an equivalent process would check well-formed-ness of the XML text, create and store one or more programmatic objects for use in implementing the security certificate (construct an object model), and call an action routine to apply the security certificate to the device. The action routine may be a part of Operating System 202, or may be separately provided, e.g., within the XML text, delimited by appropriate tags. The action routine is responsible for carrying out any needed syntax check on the certificate information, action routine information, or other payloads carried within the XML text.

Thus, embodiments provide a generic transport infrastructure and a provisioning infrastructure that is specific to CLI commands.

FUNCTIONAL OVERVIEW OF CONFIGURATION SERVICE

As described in detail above with respect to operation of Configuration Agent 200, in one method of configuration, a Device makes an HTTP request for device configuration information by issuing an HTTP GET request, and provides a unique identifier that is used to locate a configuration template associated with that device.

In an embodiment, the format of the request is: GET <web-page>?DeviceID=<UniqueID>, where "web-page" identifies the Web page that the configuration agent uses to retrieve the device configuration. An identifier that uniquely identifies the device to be configured, e.g., a router hostname, is provided as the "<UniqueID>" field value. Any unique label may be provided, and it is used in effect as a key into Directory 110 to find a matching configuration template. For example, a request may be:

GET/Config/config.asp?DeviceID=CNSAD_7200_1

In one specific embodiment, active server pages are used and each ASP is identified in the request. Such HTTP requests have the form http://<srv-name-or-ip-address>/
config.html?DeviceID=demoRouter &?User=Joe& Password=xsxs where DeviceID specifies a unique identifier which will be used to identify the device configuration template in the directory. Optionally, a User value and a Password value are provided to access Directory 110.

In another embodiment, the format of such a request is:
http://<srv-ip-address>/config/
config.asp?DeviceID=<deviceID> or http://<srv-ip-address>/servlets/
config?DeviceID=<deviceID> where srv-ip-address is the IP address of a server such as Web server 206 that has one or more ASP pages or servlets are installed. For example, a request may be:

http://10.10.1.1/config?DeviceID=c7200

Each such HTTP request is received at Web server 206 of Configuration Server 116. In response, Web server 206 invokes an ASP page or Java® servlet that is identified in the request, and executes the code embedded in the ASP page or servlet. During execution of such code, Web server 206 may access Directory 110 and retrieve a configuration template, substitute all the parameter values specified in the template, and prepare an instantiated configuration file. Web server 206 then sends the configuration file 212 to the device 114 in XML format.

Figure 3:
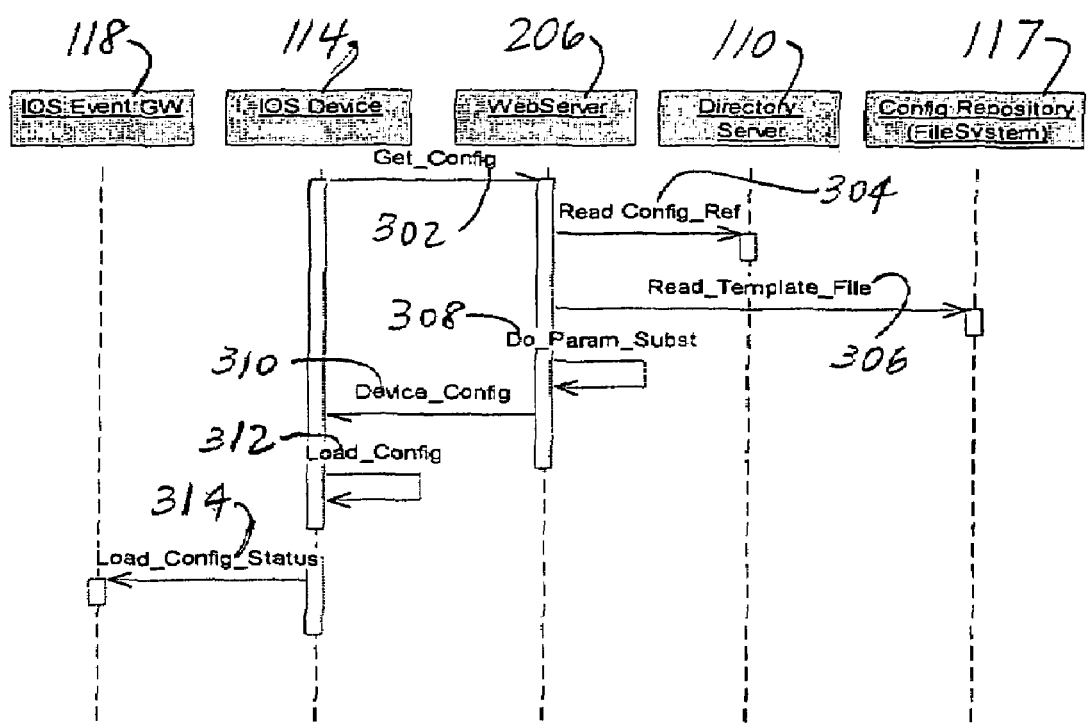
FIG. 3 is a use case diagram that illustrates an example of messages that may be communicated among elements of the system of FIG. 1 to carry out loading a device configuration.

The functions of Configuration Server 116 may be understood more fully with reference to FIG. 3, which is a use case diagram that illustrates an example of messages that may be communicated among elements of the system of FIG. 1 to carry out loading a device configuration, in one embodiment.

To initiate configuration loading, device 114 carries out a Get_Config operation 302 in which the device requests Web server 206 to provide configuration information. In response, Web server 206 carries out a Read Config_Ref operation 304 in which the Web server attempts to read configuration parameter information that is associated with device 114 from Directory 110. Further, Web server 206 carries out a Read_Template_File operation 306 in which the Web Server obtains configuration template information from a file system 117 of Configuration Server 116.

Upon obtaining parameterization information and a template for the device, Web server 206 carries out a Do_Param- _Subst operation in which one or more software elements associated with Web server 206 substitute appropriate parameter values into the template, and create and store an XML configuration file. Web server 206 then carries out a Device_Config operation 310 in which the Web server sends the configuration file to the device 114.

In response, device 114 carries out a Load_Config operation 312 in which the device loads the configuration, for example, in the manner described above. Optionally, upon completion of configuration loading, device 114 executes a Load_Config_Status operation 314 in which the result of the loading operation is reported to Event Gateway 118 in the form of an event.

PROVIDING CONFIGURATION INFORMATION USING EXTENSIBLE MARKUP LANGUAGE

Figure 8A:
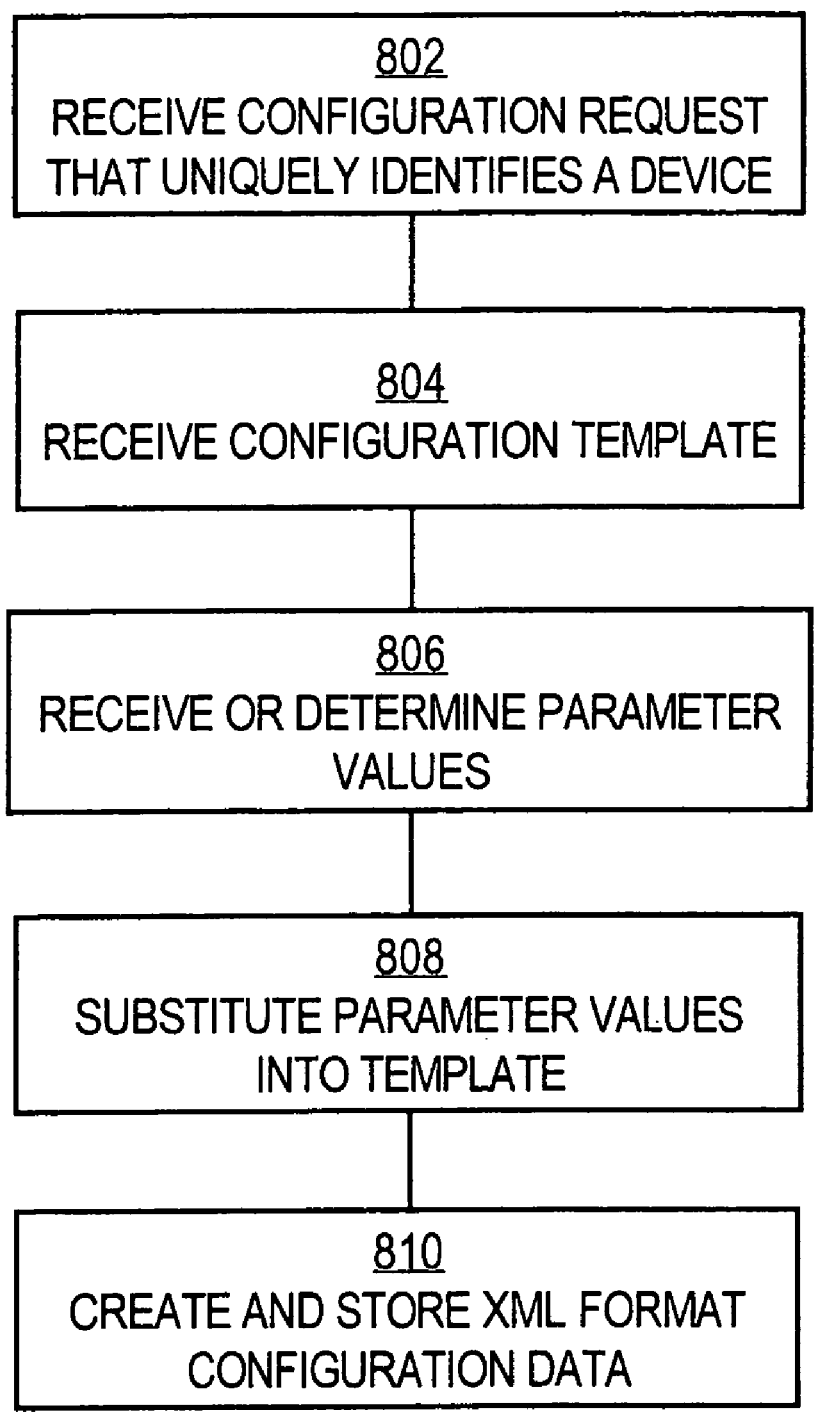
FIG. 8A is a flow diagram of a process of providing configuration information using Extensible Markup Language.

FIG. 8A is a flow diagram of a process of providing configuration information using Extensible Markup Language.

In block 802, a configuration request that uniquely identifies a device is received. In one embodiment, block 802 involves receiving an HTTP request that includes a device name that uniquely identifies a device for configuration.

In block 804, a configuration template is retrieved. The configuration template generally describes a configuration that may be applied to one or more devices. In an embodiment, the configuration template includes zero or more parameters that may be resolved into specific values applicable to a particular device, to result in creating a complete set of configuration information. The configuration template may be retrieved, for example, from a directory, database, etc. In block 806, the parameter values are retrieved or determined. The parameter values may be received from objects in the directory, database, etc. Alternatively, the parameter values may be computed. In block 808, the parameter values are substituted into the template, resulting in creating a complete set of fully-instantiated configuration information. In block 810, XML format configuration data is created and delivered, based on the instantiated configuration information.

Figure 8B:
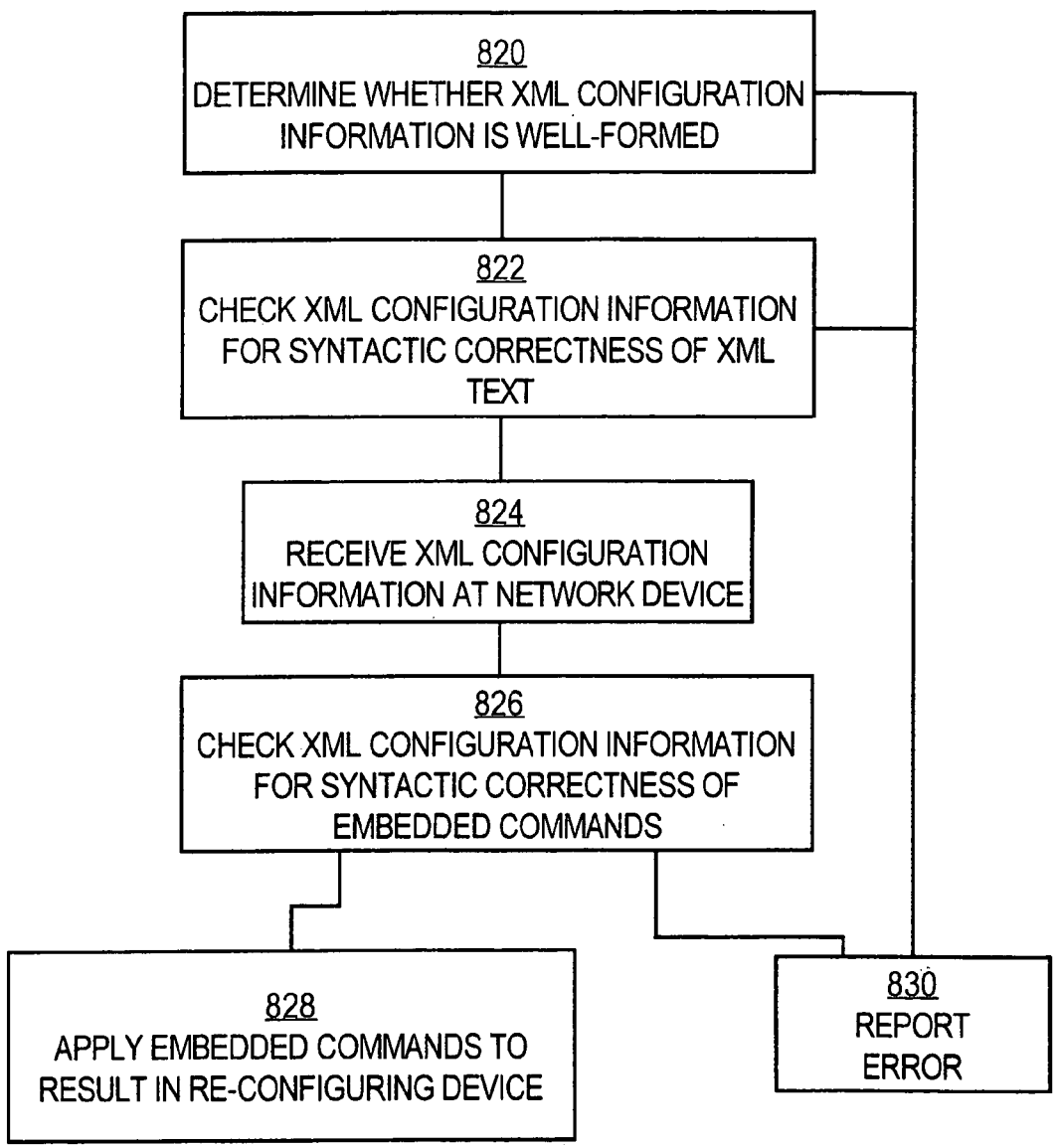
FIG. 8B is a flow diagram of a process of providing configuration information using Extensible Markup Language.

FIG. 8B is a flow diagram of a process of providing configuration information using Extensible Markup Language.

In block 820, the process determines whether the XML configuration information is well-formed. In one embodiment, this determination is carried out by a configuration service before the XML configuration information is provided to the network device. Similarly, in block 822, the XML configuration information is checked for syntactic correctness of the XML text. If errors result, control is transferred to block 830 in which errors are reported or otherwise processed. Error reporting may include generating error events with an event service.

In block 824, the XML configuration information is retrieved at the network device. In block 826, the XML configuration information is checked for syntactic correctness of embedded commands. In one specific embodiment, block 826 involves checking syntactic correctness of CLI commands that are carried in the XML configuration information, delimited by or embedded within XML tags. If errors occur, error processing may be carried out at block 830. If the checks succeed, then the embedded commands are applied to the device in block 828, resulting in re-configuring the device, e.g., as set forth in the CLI commands. In a preferred embodiment, block 826 and block 828 are carried out by a configuration agent at the device.

Any of the foregoing blocks may also involve generating one or more events to an event service, for consumption by subscribing processes, applications or devices. For example, a successful configuration or a failed configuration may result in publication of an event. Semantic errors encountered in applying the configuration information in block 828 may cause events. Receipt of a template or successful parameterization may also result in events.

In one specific embodiment, Configuration Server 116 provides configuration information to Configuration Agent 200 of device 114 in a configuration file that is formatted according to a grammar (document type definition or "DTD") conforming to Extensible Markup Language (XML). Table 1 sets forth an example DTD for the configuration information that may be used in one specific embodiment.

TABLE 1

| XML DTD FOR CONFIGURATION INFORMATION |
| --- |
| <!ELEMENT config-data (config-id , error-info? , cli*)> <br> <!ELEMENT error-info (line-number? , error-message )> <br> <!ELEMENT config-id (#PCDATA )> <br> <!ELEMENT error-message (#PCDATA )> <br> <!ELEMENT line-number (#PCDATA )> <br> <!ELEMENT cli (#PCDATA )> |

In the foregoing DTD, the element config-data contains the element config-id, which is used as the context for failure or completion events. The element error-info is optional and is returned by Web server 206 of Configuration Server 116 only if there are errors in creating or building the configuration file 212. In that case, the optional element line-number in the error-info is not used. If the element error-info is present, then there are no CLI elements, and therefore so the element cli can be included zero or more times.

Table 2 sets forth an example of XML configuration information that conforms to the foregoing DTD.

TABLE 2

| XML DATA EXAMPLE |
| --- |
| <config-data> <br>    <config-id> Router1-030500 </config-id> <br>    <cli> interface FastEthernet 1 </cli> <br>    <cli> ip address 1.2.3.4 </cli> <br> </config-data> |

In one specific embodiment, a separate XML DTD is used for data for failures that is sent out as part of failure or sync-status events. Table 3 sets forth an example XML DTD that may be used for this purpose.

TABLE 3

XML DTD FOR FAILURE AND SYNC STATUS EVENTS

```
<!ELEMENT config-failure (identifier, config-id, error-info )>
<!ELEMENT error-info (line-number? , error-message )>
<!ELEMENT identifier (#PCDATA )>
<!ELEMENT config-id (#PCDATA )>
<!ELEMENT line-number (#PCDATA )>
<!ELEMENT error-message (#PCDATA )>
```

In this DTD, the element config-failure contains an element identifier that is used to distinguish a partial configuration that was in error. If the error occurred in an initial configuration, then the element identifier will have the value "INIT-CONFIG". The DTD also contains the element config-id, which is used to identify which configuration data was in error. The element error-info contains the element line-number which is the line number of the cli command in the configuration data. The element error-message in error-info will contain a text string describing the problem with the configuration command.

Table 4 sets forth an example of XML event data that conforms to the foregoing DTD.

TABLE 4

EXAMPLE XML EVENT DATA

```
<config-failure>
    <identifier> OSIRIS-030500-1330 </identifier>
    <config-id> Router1-030500 </config-id>
    <error-info>
        <line-number> 1 </line-number>
        <error-message> Incomplete command </error-message>
    </error-info>
</config-failure>
```

In one specific embodiment, the Configuration Server 116 sends configuration success event data in XML format according to an XML DTD. Table 5 sets forth, for one embodiment, the XML DTD for the data for successful completion that will be sent to Event Service 120 in the form of a "complete" or "sync-status" event.

TABLE 5

XML DTD FOR SUCCESSFUL COMPLETION OF CONFIGURATION

```
<!ELEMENT config-success (identifier, config-id )>
<!ELEMENT identifier (#PCDATA )>
<!ELEMENT config-id (#PCDATA )>
```

In this DTD, the element config-success contains the element identifier, which is used to distinguish the partial configuration that was completed. If an initial configuration was completed, then the element identifier will have the value "INIT-CONFIG". The element config-success also contains the element config-id, which identifies which configuration was successfully completed.

Table 6 sets forth an example of XML event data that conforms to the foregoing DTD.

TABLE 6

XML TEXT FOR SUCCESSFUL COMPLETION OF CONFIGURATION

```
<config-success>
    <identifier> OSIRIS-030500-1330 </identifier>
    <config-id> Router1-030500 </config-id>
</config-success>
```

In one specific embodiment, a separate XML DTD defines the format of configuration event data when the configuration data is obtained from a Web server using the HTTP GET request. Table 7 sets forth an embodiment of an XML DTD that may be used.

TABLE 7

DTD FOR CONFIGURATION DATA OBTAINED FROM WEB SERVER

```
<!ELEMENT config-server (identifier , server-info)>
<!ATTLIST config-server   config-action (read | write | persist)
                          #REQUIRED
                          no-syntax-check (TRUE | FALSE)
                          #REQUIRED>
<!ELEMENT server-info (ip-address , web-page)>
<!ELEMENT ip-address (#PCDATA )>
<!ELEMENT web-page (#PCDATA )>
<!ELEMENT identifier (#PCDATA )>
```

In the foregoing DTD, the element config-server contains the element identifier, which is used as an id when doing synchronized partial configuration. The element server-info contains the element ip-address, which is the ip address of the Web server, e.g., Web Server 206, and the element web-page identifies a Web page to which the device should go to get the configuration data.

The element config-server also has attributes config-action and no-syntax-check. If config-action is set to "read," then Configuration Agent 200 does not apply the configuration until it is explicitly told to do so by another event that contains the config-write element (described later). If config-action is set to "write," then the configuration will be read in. Further, the syntax of the configuration information is checked if no-syntax-check attribute is "FALSE". After the syntax check, the configuration information is applied to the device.

If the attribute config-action is set to "persist," then the configuration is written to NVRAM of the device after it is applied.

Table 8 sets forth an example of XML data for partial configuration from a Web server that conforms to the foregoing DTD.

TABLE 8

XML DATA FOR PARTIAL CONFIGURATION FROM A WEB SERVER

```
<config-server  config-action="read", no-syntax-check="FALSE">
    <identifier> OSIRIS-030500-1330 </identifier>
    <server-info>
        <ip-address> 1.2.3.4 </ipaddress>
        <web-page> osiris/config.asp </web-page>
    </server-info>
</config-server>
```

In one specific embodiment, an XML DTD is provided for configuration events that include configuration data. Table 9 presents an example of XML for the configuration event data when the configuration data is present in the event data.

TABLE 9

XML FOR CONFIGURATION DATA IN EVENT DATA

```
<!ELEMENT config-event (identifier , config-data)>
<!ATTLIST config-event  config-action (read | write | persist)
                       #REQUIRED
                       no-syntax-check (TRUE | FALSE)
                       #REQUIRED>
<!ELEMENT config-data (config-id , error-info? , cli*)>
<!ELEMENT error-info (line-number? , error-message )>
<!ELEMENT identifier (#PCDATA )>
<!ELEMENT config-id (#PCDATA )>
<!ELEMENT cli (#PCDATA )>
<!ELEMENT line-number (#PCDATA )>
<!ELEMENT error-message (#PCDATA )>
```

In the foregoing DTD, the element config-event contains the element identifier, which is used as an id when doing synchronized partial configuration. The element config-data is the same as described with respect to Table 1, except that the optional element error-info is not included. The element config-event also has attributes config-action and no-syntax-check which are described in the previous section on config-server.

Table 10 sets forth an example of XML data for partial configuration from data contained in the event that conforms to the foregoing DTD.

TABLE 10

XML DATA FOR PARTIAL CONFIGURATION

```
<config-event config-action="read", no-syntax-check="FALSE">
    <identifier> OSIRIS-030500-1330 </identifier>
    <config-data
        <config-id> Router1-030500 </config-id>
        <cli> interface FastEthernet 1 </cli>
        <cli> ip address 1.2.3.4 </cli>
    </config-data>
</config-event>
```

In another specific embodiment, a separate XML DTD defines how a configuration event applies a previously sent configuration. In one example embodiment, the XML configuration event data for the event that is sent to the IOS device to apply a previously sent configuration conforms to the DTD set forth in Table 11.

TABLE 11

XML CONFIGURATION EVENT DATA TO APPLY A PREVIOUS CONFIGURATION

```
<!ELEMENT config-write (identifier )>
<!ATTLIST config-write write-action (write | cancel | persist)
#REQUIRED>
<!ELEMENT identifier (#PCDATA )>
```

The element config-write contains the element identifier, which is the id used to identify the configuration data that is to be applied or canceled. This is the identifier that was passed in the config-server or config-event. The element config-write also has an attribute write-action, which if set to "write" means that the Configuration Agent 200 applies the configuration. If the write-action attribute is set to "cancel" then Configuration Agent 200 deletes the configuration from the buffer. If the write-action attribute is set to "persist" then the configuration is applied and then written to NVRAM.

Table 12 sets forth an example of XML data for applying a partial configuration that conforms to the foregoing DTD.

TABLE 12

XML DATA FOR APPLYING A PARTIAL CONFIGURATION

```
<config-write  write-action="write">
    <identifier> OSIRIS-030500-1330 </identifier>
<config-write>
```

CONFIGURATION TEMPLATES

As described above, each HTTP GET request includes a device identifier. In an embodiment, the device identifier is used by Web server 206, in cooperation with Directory 110, to identify a unique Device object that has been previously stored in Directory 110. Within each Device object in Directory 110, a Template Configuration attribute ("LGConfigTemplate") value specifies an associated configuration template 210 to use for the configuration of the device. Each configuration template 210 may be implemented as a container object in Directory 110. The value of the attribute may be a name of the template file. An example of values of such objects can be:

DeviceID : DemoRouter

IOSConfigTempate : template/demoRouter.txt

Each template 210 contains a configuration template comprising one or more CLI strings, each having zero or more parameters that may be specified for a particular device ("instantiated"). In a template, a parameter is specified using a complete directory distinguished name ("DN") of an object and an attribute name. To instantiate the template for a particular device, one or more ASP pages or servlets finds each named object and its associated attribute value in the directory, substitutes the value into the CLI strings that are set forth in the template, and creates and stores an XML file containing the instantiated configuration information. If the XML specification is well formed, then the XML specification of the instantiated configuration describes each CLI command in an XML tag.

In a configuration template that has zero parameters, the configuration template may be used directly as a configuration file.

As a specific example of information that may be provided using the foregoing processes and mechanisms, Table 13 presents an example of an IOS network device configuration template, and Table 14 presents an example of the resulting XML format configuration information, including substitution of parameters.

TABLE 13

EXAMPLE CONFIGURATION TEMPLATE

```
!
version 12.0
service timestamps debug uptime
service timestamps log uptime
no service password-encryption
service udp-small-servers
service tcp-small-servers
!
hostname test
boot system flash c7200-is-mz-new
boot system flash c7200-is-mz
enable secret 5 $1$cMdI$.e37TH540MWB2GW5gMOn3/
ip subnet-zero
!
interface FastEthernet0/0
no ip address
no ip directed-broadcast
no ip route-cache
no ip mroute-cache
shutdown
half-duplex
!
interface Ethernet1/0
ip address
${LDAP://10.10.1.1/cn=${DeviceID},CN=IOSConfigs,DC=scratch,
DC=com:attrName=IOSipaddress} $ {LDAP://10.10.1.1/cn=
${DeviceID},CN=IOSConfigs,DC=scratch,DC=com:attrName=
IOSsubnetmask}
no ip directed-broadcast
no ip route-cache
no ip mroute-cache
!
interface Ethernet1/1
no ip address
no ip directed-broadcast
no ip route-cache
no ip mroute-cache
shutdown
!
ip classless
ip route 0.0.0.0 0.0.0.0 10.10.1.33
ip http server
!
dialer-list 1 protocol
ip ${LDAP://10.10.1.1/cn=${DeviceID},CN=IOSConfigs,DC=scratch,
DC=com:attrName=IOSipAccess}
dialer-list 1 protocol
ipx ${LDAP://10.10.1.1/cn=${DeviceID},CN=IOSConfigs,DC=scratch,
DC=com:attrName=IOSipxAccess}
!
line con 0
transport input none
line aux 0
line vty 0 4
!
end
```

In the above template, each of the parameter URLs identifies an LDAP directory server at IP address 10.10.1.1, and the attributes in the object identified by the deviceID are IOSipaddress, IOSsubnetmask, IOSipAccess and IOSipxAccess.

Table 14 sets forth the resulting configuration information in XML format.

TABLE 14

XML FORMAT CONFIGURATION INFORMATION

```
<?xml version="1.0" encoding="UTF-8"?>
<config>
<cli>!<cli>
<cli>version 12.0</cli>
<cli>service timestamps debug uptime</cli>
<cli>service timestamps log uptime</cli>
<cli>no service password-encryption</cli>
<cli>service udp-small-servers</cli>
<cli>service tcp-small-servers</cli>
<cli>!<cli>
<cli>hostname test</cli>
<cli>boot system flash c7200-is-mz-new</cli>
<cli>boot system flash c7200-is-mz</cli>
<cli>enable secret 5 $1$cMdI$.e37TH540MWB2GW5gMOn3/</cli>
<cli>ip subnet-zero</cli>
<cli>!<cli>
<cli>interface FastEthernet0/0</cli>
<cli>no ip address</cli>
<cli>no ip directed-broadcast</cli>
<cli>no ip route-cache</cli>
<cli>no ip mroute-cache</cli>
<cli>shutdown</cli>
<cli>half-duplex</cli>
<cli>!<cli>
<cli>interface Ethernet1/0</cli>
<cli>ip address 10.10.1.36 255.255.255.224</cli>
<cli>no ip directed-broadcast</cli>
<cli>no ip route-cache</cli>
<cli>no ip mroute-cache</cli>
<cli>!</cli>
<cli>interface Ethernet1/1</cli>
<cli>no ip address</cli>
<cli>no ip directed-broadcast</cli>
<cli>no ip route-cache</cli>
<cli>no ip mroute-cache</cli>
<cli>shutdown</cli>
<cli>!<cli>
<cli>ip classless</cli>
<cli>ip route 0.0.0.0 0.0.0.0 10.10.1.33</cli>
<cli>ip http server</cli>
<cli>dialer-list 1 protocol ip permit</cli>
<cli>dialer-list 1 protocol ipx permit</cli>
<cli>!<cli>
<cli>line con 0</cli>
<cli>transport input none</cli>
<cli>line aux 0</cli>
<cli>line vty 0 4</cli>
<cli>login</cli>
<cli>!<cli>
<cli>end</cli>
</config>
```

DIRECTORY SCHEMA

In one embodiment, two schemas are defined for Directory 110, namely, a Device schema and a Template Attribute schema. In one specific embodiment of such schemas, the name of the container Class is IOSConfigClass which is derived from the class "top" and contains the following example attributes: IOSconfigTemplate; IOSipaddress; IOShostname; IOSpassword; IOSnetwork; IOSport; IOSprotocol. Instantiated Router objects are created in the container called IOSConfigs.

Table 15 sets forth an example LDAP directory schema definition (LDIF) file for IOSConfigClass, and Table 16 specifies the attribute IOSipaddress.

TABLE 15

DIRECTORY SCHEMA DEFINITION dn: CN=IOS-ConfigClass,CN=Schema,CN=Configuration,DC=ikram, DC=cisco,DC=com
changetype: add
adminDescription: IOS-ConfigClass
adminDisplayName: IOS-ConfigClass
cn: IOS-ConfigClass
defaultObjectCategory:
CN=IOS-ConfigClass,CN=Schema,CN=Configuration,DC=ikram, DC=cisco,Dc=com
governsID: 1.2.840.113548.1.5.7000.1.501
instanceType: 4
lDAPDisplayName: IOSConfigClass
mayContain: IOSport
mayContain: IOSprotocol
mayContain: IOSipaddress4
mayContain: IOSipaddress3
mayContain: IOSipaddress2
mayContain: IOSipaddress1
mayContain: IOSroutername
mayContain: IOSnetwork
mayContain: IOSconfigtemplate
mayContain: IOSpassword
mayContain: IOSipaddress
mayContain: IOShostname
distinguishedName:
CN=IOS-ConfigClass,CN=Schema,CN=Configuration,DC=ikram, Dc=cisco,Dc=com
objectCategory:
CN=Class-Schema,CN=Schema,CN=Configuration,DC=ikram,DC=cisco, Dc=com
objectClass: classSchema
objectClassCategory: 1
objectGUID:: y0qsUV/U0xGiCQBgsO9LLw==
possSuperiors: container
name: IOS-ConfigClass
rDNAttID: cn
schemaIDGUID:: zEqsUV/U0xGiCQBgsO9LLw==
showInAdvancedViewOnly: TRUE
subClassOf: top
systemOnly: FALSE
uSNChanged: 29754

TABLE 16

ATTRIBUTE DEFINITION FOR EXAMPLE ATTRIBUTE IOSipaddress dn: CN=IOSIP-Address,CN=Schema,CN=Configuration,DC=ikram, DC=cisco,DC=com
changetype: add
adminDescription: IOSIP-Address
adminDisplayName: IOSIP-Address
attributeID: 1.2.840.113548.1.4.7000.1.503
attributeSyntax: 2.5.5.12
cn: IOSIP-Address
instanceType: 4
isSingleValued: TRUE
lDAPDisplayName: IOSipaddress
distinguishedName:
CN=IOSIP-Address,CN=Schema,CN=Configuration,DC=ikram, DC=cisco,Dc=com
objectCategory:
CN=Attribute-Schema,CN=Schema,CN=Configuration,DC=ikram, DC=cisco,DC=com
objectClass: attributeSchema
objectGUID:: TZkxT17U0xGiCQBgsO9LLw==
oMSyntax: 64
name: IOSIP-Address
schemaIDGUID:: TpkxT17U0xGiCQBgsO9LLw==
showInAdvancedViewOnly: TRUE
uSNChanged: 29730
uSNCreated: 29730
whenChanged: 20000127020607.0Z
whenCreated: 20000127020607.0Z In the foregoing specific example, the Device Schema is assumed to be available in the Directory. Also, it is assumed that Devices will be populated in the Directory Services database and configuration template references will be set on Device objects in the Directory. During installation, an administrative user is prompted to enter the location in the Directory where Devices are located. Such a base location is saved, e.g., in the Windows 2000 registry, or in a properties file, for use by the ASP pages or Servlets.

GRAPHICAL USER INTERFACE

FIG. 4, FIG. 5, FIG. 6, FIG. 7 present examples of screen displays that may be generated by Configuration Server 116, in one example embodiment.

In one embodiment, when Configuration Server 116 operates, it presents a login screen display that prompts a user to enter a user name and password, or other authentication information, and then authenticates the information entered by the user.

Figure 4:
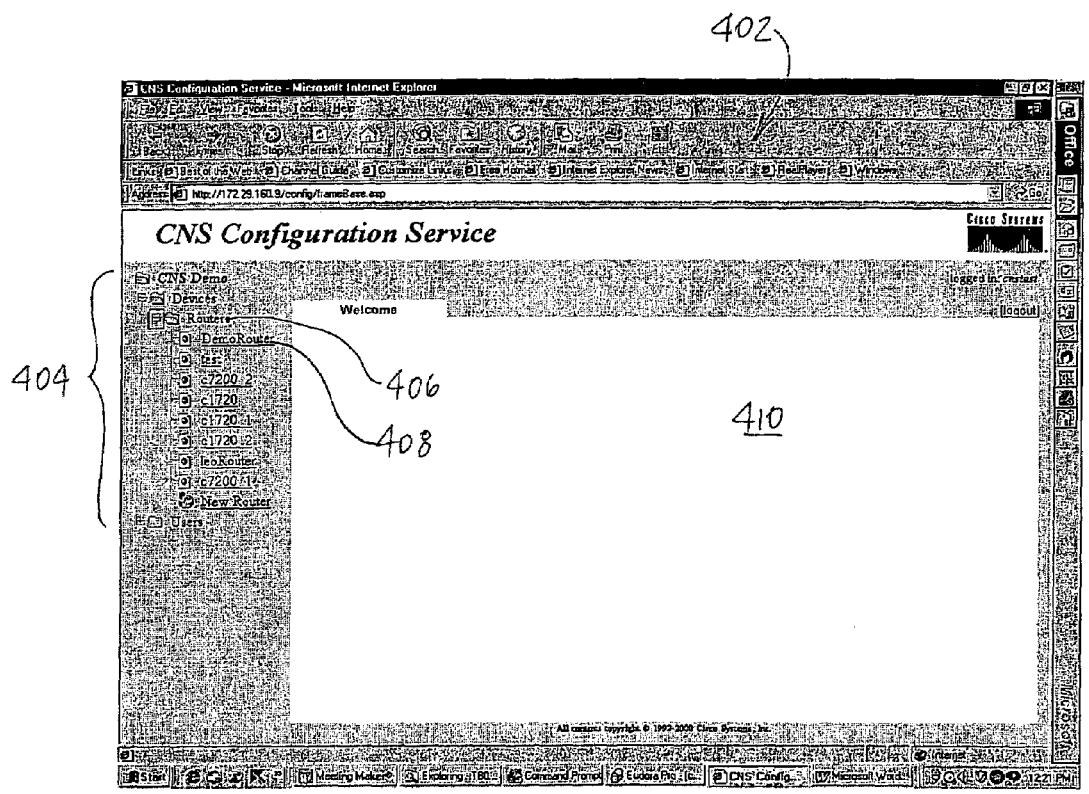
FIG. 4 is a diagram of a screen display generated by a configuration service.

FIG. 4 is a diagram of a screen display generated by a configuration service if the user is authenticated and authorized to use the service. Screen display 402 generally comprises an object tree 404 and one or more display tabs 410. In the example of FIG. 4, object tree 404 includes Device objects and User objects. The Device object sub-tree includes a further sub-tree of Routers 406. The sub-tree of Routers 406 has been expanded and displays names of example routers. One of the display tabs 410, a "Welcome" tab, is provided as a placeholder until a user selects one of the objects identified in the object tree 404.

Figure 5:
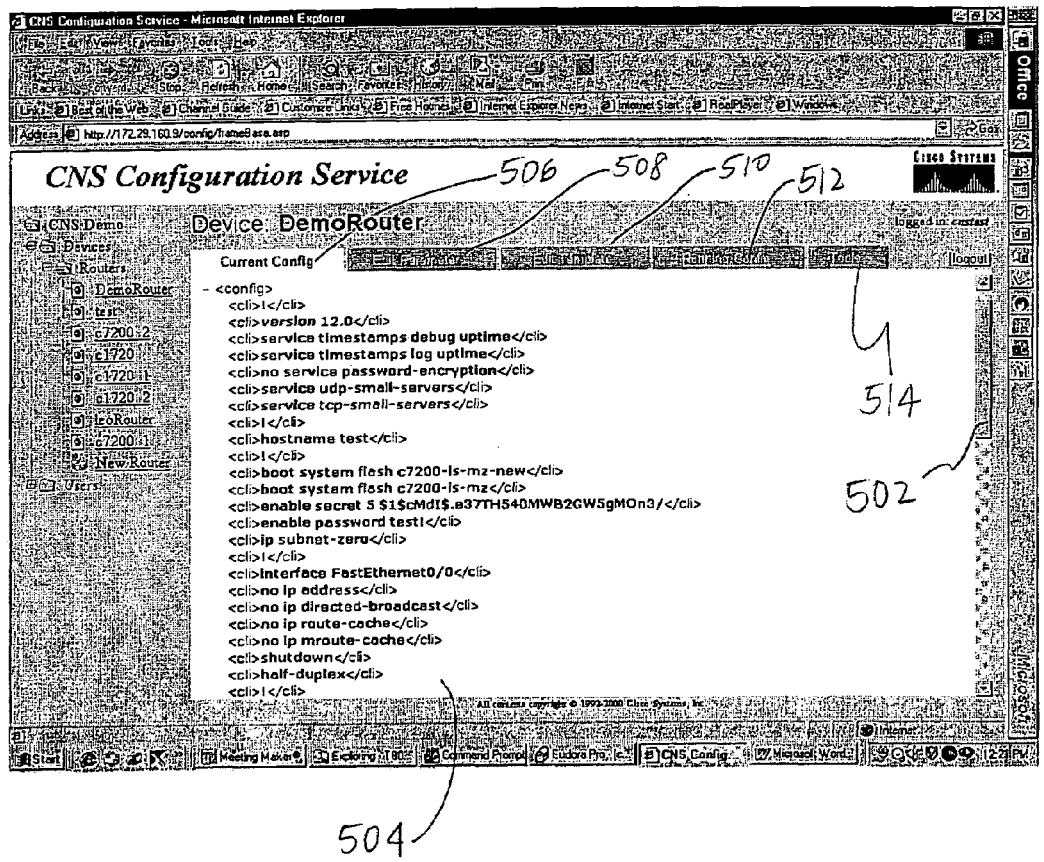
FIG. 5 is a diagram of a screen display of a current configuration of a selected device that may be generated by a configuration service.

Assume now that a user selects the router named "DemoRouter" from the sub-tree of Routers 406. In response, as shown in FIG. 5, the Welcome tab is removed and Configuration Server 116 displays in its place a Current Config tab 506, Edit Parameters tab 508, Edit Template tab 510, Running Config tab 512, and Tools tab 514. In the example of FIG. 5, the user has selected the Current Config tab 506, causing the system to display text 504 comprising the current configuration file of the device. The user may use scroll bar 502 to advance the display to any part of the configuration file.

Figure 6:
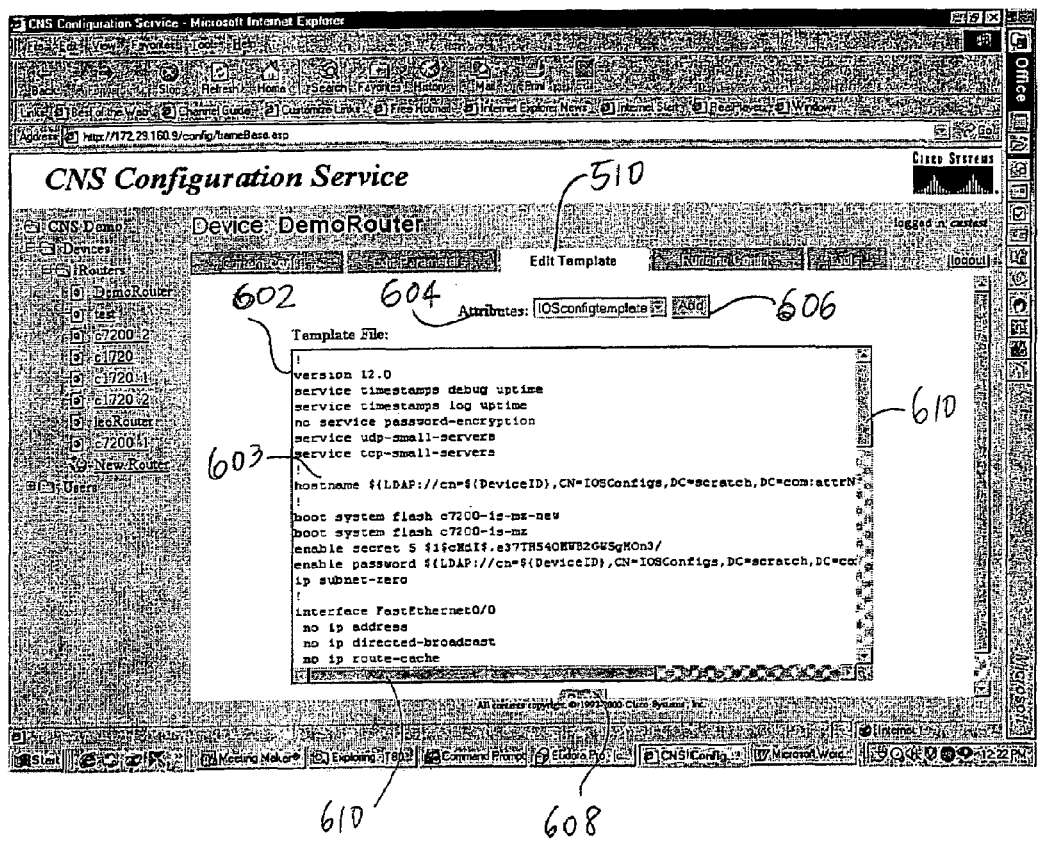
FIG. 6 is a diagram of a screen display that is generated by a configuration service during an edit template operation.

FIG. 6 is a diagram of a screen display that may be generated by Configuration Server 116 during an edit template operation in response to selection of Edit Template tab 510. Text 603 comprising the contents of the template file for the currently selected device is displayed in a Template File pane 602. Scroll bars 610 permit displaying portions of the text 603 that overflow the pane 602. An Attributes pull-down menu 604 displays one or more attributes in the Directory 110 that are associated with the currently selected device. The attribute that is currently selected in pull-down menu 604 may be added to text 603 by selecting an Add button 606. Other editing may be carried out on the template file by manipulating text 603 using standard text editing operations. When the text 603 is modified, the changed text may be saved by selecting Save button 608.

Figure 7:
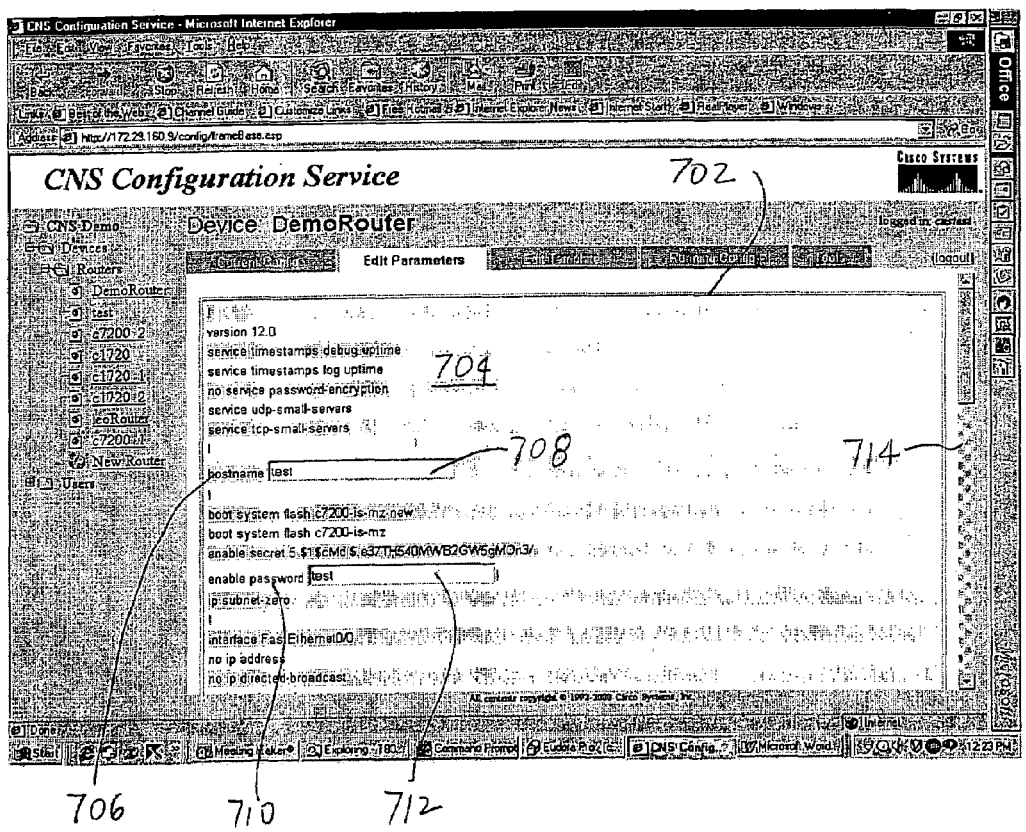
FIG. 7 is a diagram of a screen display that is generated by a configuration service during an edit parameters operation.

FIG. 7 is a diagram of a screen display that may be generated by Configuration Server 116 during an edit parameters operation in response to user selection of the Edit Parameters tab 508.

Parameterized text 704 of the current template file is displayed in a text pane 702. Scroll bars 714 permit displaying portions of parameterized text 704 that overflow the text pane 702. Within the text 704, an attribute name and a text box are displayed at each location that accepts entry of a parameter value. For example, the attribute "hostname" 706 accepts entry of a parameter value in a first text box 708. Similarly, the attribute "enable password" accepts entry of a parameter in a second text box 710. An administrative user may create a template having specific parameter values by entering appropriate values in the text boxes.

HARDWARE OVERVIEW

Figure 9:
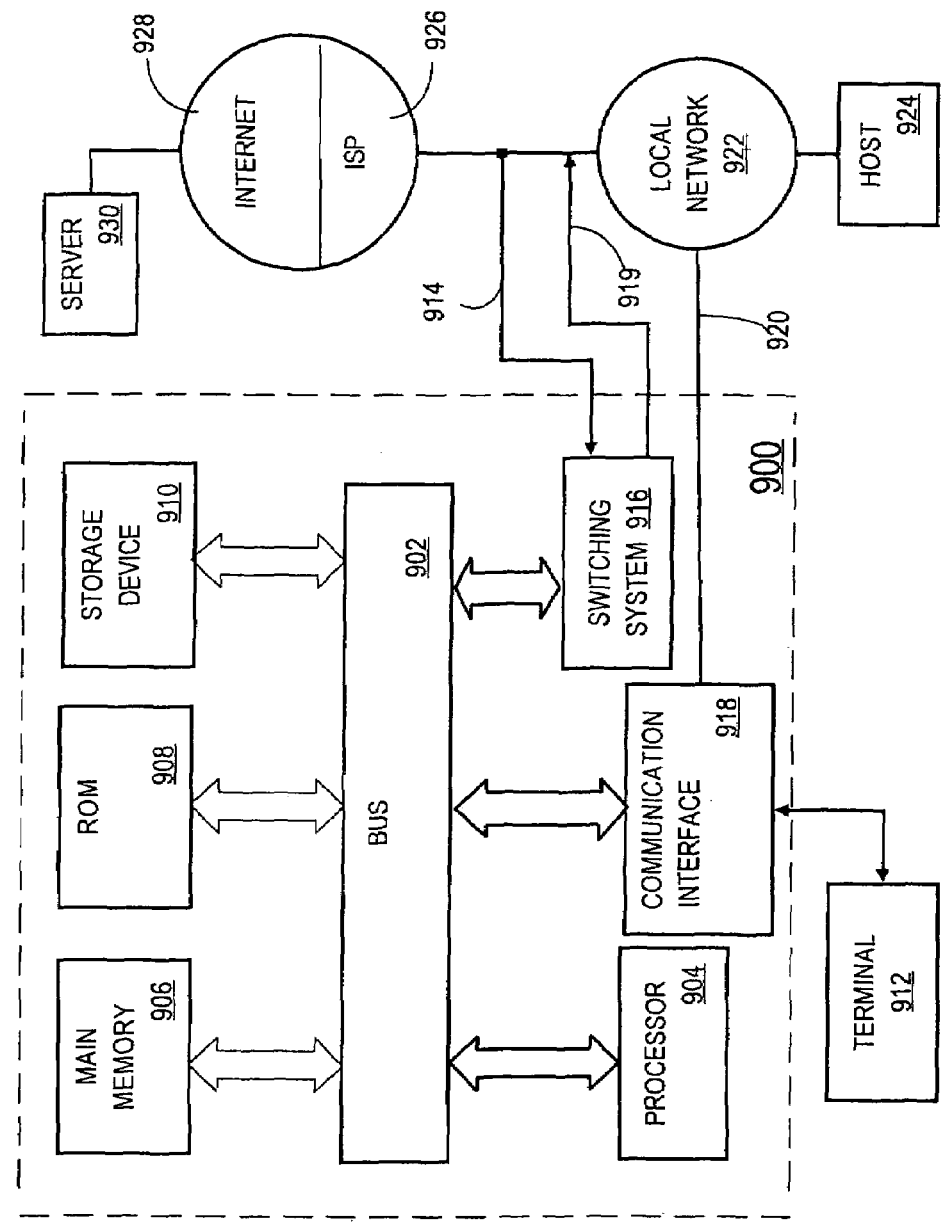
FIG. 9 is a block diagram that illustrates a computer system upon which an embodiment may be implemented.

FIG. 9 is a block diagram that illustrates a computer system 900 with which an embodiment of the Configuration Agent 200 may be implemented. Embodiments may be implemented using one or more computer programs running on a network element such as a router device. Thus, in this embodiment, the computer system 900 is a router. An embodiment of the Configuration Server 116 may be implemented using one or more computer programs or other software elements that are stored and executed by a general-purpose computer system, e.g., Sun workstation or server, Dell server, etc.

Computer system 900 includes a bus 902 or other communication mechanism for communicating information, and a processor 904 coupled with bus 902 for processing information. Computer system 900 also includes a main memory 906, such as a random access memory (RAM), flash memory, or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, flash memory or optical disk, is provided and coupled to bus 902 for storing information and instructions.

An communication interface 918 may be coupled to bus 902 for communicating information and command selections to processor 904. Interface 918 is a conventional serial interface such as an RS-232 or RS-422 interface. An external terminal 912 or other computer system connects to the computer system 900 and provides commands to it using the interface 914. Firmware or software running in the computer system 900 provides a terminal interface or character-based command interface so that external commands can be given to the computer system.

A switching system 916 is coupled to bus 902 and has an input interface 914 and an output interface 919 to one or more external network elements. The external network elements may include a local network 922 coupled to one or more hosts 924, or a global network such as Internet 928 having one or more servers 930. The switching system 916 switches information traffic arriving on input interface 914 to output interface 919 according to pre-determined protocols and conventions that are well known. For example, switching system 916, in cooperation with processor 904, can determine a destination of a packet of data arriving on input interface 914 and send it to the correct destination using output interface 919. The destinations may include host 924, server 930, other end stations, or other routing and switching devices in local network 922 or Internet 928.

The invention is related to the use of computer system 900 for the techniques and functions described herein in a network system. According to one embodiment of the invention, such techniques and functions are provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Communication interface 918 also provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for the techniques and functions that are described herein.

The received code may be executed by processor 904 as it is received, and/or stored in storage device 910, or other non-volatile storage for later execution. In this manner, computer system 900 may obtain application code in the form of a carrier wave.

CONCLUSION

A method and apparatus for provisioning network devices using Extensible Markup Language have been disclosed. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative sense rather than a restrictive sense.

In the disclosed embodiments, a template driven configuration feature provides a powerful way to integrate network devices and applications to deliver network services with ease and efficiency. The disclosed mechanism can be used by various provisioning services as a method of transport. Embodiments enable standardized communication with XML data. As a result, device provisioning may be integrated into any system that understands XML. Thus, provisioning may be accomplished in a network that contains heterogeneous devices, if the devices can understand XML data.

Embodiments may also achieve reduced cost of service activation. For example, a network device may be installed at customer premises by a relatively less skilled technician, and then configured remotely in the manner described above. Thus, there is no need for a visit to the customer premises by a skilled technician to carry out configuration. The resulting cost savings are estimated at hundreds of dollars per technician visit. Since establishing a device configuration is made easy, using standard templates and centralized device information, embodiments provide powerful configuration features for high-volume, more standardized IP service, e.g., multi-site networks, home networks, ADSL/Cable modems and access services.

Further, a reliable transport mechanism is provided, using HTTP, TCP, and a separate payload that contains delimiter tags that may be used to verify that complete configuration has been received.

Embodiments described herein also facilitate improved service. Removal of manual configuration tasks and processes may result in faster service activation. Maintainability of the set of services on a per-customer basis can be improved because staff, systems and network devices will all derive their operational information from the same repository. Therefore, fewer inconsistencies, conflicting network configurations, or other unexpected network behavior will occur.

Alternative embodiments are applicable to automatic configuration of computer program applications, rather than network devices. Such embodiments are contemplated for use with application programs that need current information about network devices or topology in order to operate properly in a network environment. In such an embodiment, an application program requests network topology information. A configuration server retrieves a template of network topology information from a repository, such as a directory service, and resolves elements of the topology into application-specific values, resulting in creating and storing resolved topology information. The configuration server then provides the resolved configuration information to a configuration agent within the application program. In response to receiving the resolved topology information, the application program self-configures itself to operate with the then-current network configuration. Resolution of template values also may involve carrying out application-specific syntax checking.

What is claimed is:

1. A method of automatically configuring a network device, the method comprising the computer-implemented steps of:
    receiving a request from the network device to provide configuration information;
    retrieving a template describing a device configuration, wherein the template comprises symbolic references to one of a plurality of values of one or more parameters that may receive values specific to a particular device;
    wherein each symbolic reference identifies an operation and a list of parameters for that operation;

retrieving from a repository of the plurality of values, based on the symbolic references, one or more values of parameters specific to the network device; and creating and storing a device-specific instance of the configuration information based on the template and the values of parameters specific to said network device; said configuration information conforming to an Extensible Markup Language Document Type Definition (XML DTD) and comprising one or more XML tags that delimit a beginning and an ending of the configuration information.

2. A method as recited in claim 1, further comprising the steps of:

testing the device-specific instance of configuration information to determine whether it is well-formed with respect to the XML DTD;

providing the device-specific instance of configuration information to the network device.

3. A method as recited in claim 1, further comprising the steps of:

testing the device-specific instance of configuration information to determine whether it is well-formed with respect to the XML DTD;

providing the device-specific instance of configuration information to the network device over a reliable transport protocol, wherein the network device ensures that all of the configuration information is received by checking the one or more XML tags that delimit a beginning and an ending of configuration information.

4. A method as recited in claim 2, further comprising the step of:

at the network device,
syntax checking only configuration commands of the device-specific instance of configuration information to determine whether the configuration commands therein conform to a command language that is understood by the network device;
applying the device-specific instance of configuration information to the network device.

5. A method as recited in claim 2, further comprising the step of:

at the network device,
syntax checking only configuration commands of the device-specific instance of configuration information to determine whether the configuration commands therein conform to a command language that is understood by the network device;
applying the device-specific instance of configuration information to the network device;
when a syntax error is detected during the syntax checking step, publishing an event that reports the syntax error using an event service.

6. A method as recited in claim 1, further comprising the steps of:

providing the device-specific instance of configuration information to a plurality of network devices;
at one of the network devices, syntax checking only configuration commands of the device-specific instance of configuration information to determine whether the configuration commands therein conform to a command language that is understood by the network device;
upon successful syntax checking, generating an event to an event service to which the plurality of network devices subscribe, wherein the event announces that the configuration commands conform to correct syntax;
in response to receiving the event, applying the device-specific instance of configuration information to the network devices concurrently.

7. A method as recited in claim 1, further comprising the steps of:

providing the device-specific instance of configuration information to a plurality of network devices;
upon successfully receiving the device-specific instance of configuration information at one of the network devices, generating an event to an event service to which the plurality of network devices subscribe;
in response to receiving the event, applying the device-specific instance of configuration information to the network devices concurrently.

8. A method as recited in claim 1, further comprising the steps of:

applying the device-specific instance of configuration information to the network device;
receiving a user request to cancel application of the configuration information;
restoring the network device to its state prior to application of the device-specific instance of configuration information.

9. A method as recited in claim 1, wherein the step of receiving a request from the network device to provide configuration information comprises the step of receiving an HTTP request that identifies a configuration service that can provide the configuration information and that includes a unique identifier of the network device.

10. A method as recited in claim 1, wherein the step of receiving a request from the network device to provide configuration information comprises the step of receiving an HTTP request that identifies an Active Server Page of a configuration service that can provide the configuration information and that includes a unique identifier of the network device.

11. A method as recited in claim 1, wherein the step of receiving a request from the network device to provide configuration information comprises the step of receiving an HTTP request that identifies a Java® Servlet of a configuration service that can provide the configuration information and that includes a unique identifier of the network device.

12. A method as recited in claim 1, wherein the step of receiving one or more values of parameters specific to the network device comprises the step of retrieving a container object associated with the network device from a directory in a directory service and obtaining the values of parameters from directory objects contained within the container object.

13. A method as recited in claim 1, wherein the step of retrieving a template comprises the steps of:

retrieving a reference to a template describing the configuration information from a directory service;
retrieving the template from a configuration server based on the retrieved reference, wherein the template comprises symbolic reference to one or more parameters that may receive values specific to a particular device, and wherein the step of receiving one or more values of parameters specific to the network device comprises the step of retrieving a container object associated with the network device from a directory in a directory service and obtaining the values of parameters from directory objects contained within the container object.

14. A method as recited in claim 5, wherein the step of syntax checking additionally comprises parsing one or more configuration commands from the device-specific instance of configuration information using a parser of an operating system that is executed by the network device.

15. The method as recited in claim 1, further comprising the steps of:
   determining that a partial configuration should be sent to one or more network devices;
   based on the template and the one or more values of parameters specific to the network device, creating and storing a device-specific instance of the partial configuration based on the template and the values of parameters and conforming to an Extensible Markup Language Document Type Definition (XML DTD), comprising one or more XML tags that delimit the partial configuration;
   publishing the partial configuration to an event service that is communicatively coupled to the one or more network devices.

16. The method as recited in claim 1, further comprising the steps of:
   determining that a partial configuration should be sent to one or more network devices;
   based on the template and the one or more values of parameters specific to the network device, creating and storing a device-specific instance of the partial configuration based on the template and the values of parameters and conforming to an Extensible Markup Language Document Type Definition (XML DTD), comprising one or more XML tags that delimit the partial configuration;
   publishing a partial configuration trigger event to an event service that is communicatively coupled to the one or more network devices; and
   providing the partial configuration to one or more network devices in response to requests therefrom that are received in response to the trigger event.

17. A method of automatically configuring a network device, the method comprising the computer-implemented steps of:
   generating a request to provide configuration information;
   receiving a set of configuration information conforming to an Extensible Markup Language Document Type Definition (XML DTD), the configuration information comprising one or more XML tags that delimit a beginning and an end of the configuration information, said set of configuration information based on a template describing a device configuration that is instantiated with one or more values of parameters that are specific to the network device;
   wherein the template comprises symbolic references to one of a plurality of values of one or more parameters that may receive values specific to a particular device, wherein each symbolic reference identifies an operation and a list of parameters for that operation;
   syntax checking only configuration commands of the set of configuration information to determine whether the configuration commands therein conform to a command language that is understood by the network device; and
   applying the configuration information to the network device.

18. A method as recited in claim 17, wherein the set of configuration information is received concurrently at a plurality of network devices, and further comprising the steps of:
   at one of the network devices, syntax checking only configuration commands of the set of configuration information to determine whether the configuration commands therein conform to a command language that is understood by the network device;
   upon successful syntax checking, generating a status event to an event service to which the plurality of network devices subscribe, wherein the status event announces that the set of configuration commands conform to correct syntax;
   in response to receiving a "write" event, applying the set of configuration information to the network device.

19. A method as recited in claim 17, wherein the step of generating a request to provide configuration information comprises the step of generating an HTTP request that identifies a configuration service that can provide the configuration information and that includes a unique identifier of the network device.

20. A method as recited in claim 17, wherein the step of generating a request to provide configuration information comprises the step of generating an HTTP request that identifies an Active Server Page of a configuration service that can provide the configuration information and that includes a unique identifier of the network device.

21. A method as recited in claim 17, wherein the step of generating a request to provide configuration information comprises the step of generating an HTTP request that identifies a Java® Servlet of a configuration service that can provide the configuration information and that includes a unique identifier of the network device.

22. A method as recited in claim 17, wherein the step of receiving a set of configuration information comprises the steps of, at a configuration server, receiving the template describing the device configuration from a directory service, wherein receiving said one or more values of parameters specific to the network device comprises retrieving a container object associated with the network device from a directory in a directory service and obtaining the values of parameters from directory objects contained within the container object.

23. A method as recited in claim 17, wherein the step of syntax checking comprises applying the configuration commands of the set of configuration information to a parser of an operating system that is executed by the network device.

24. An apparatus for automatically configuring a network device, comprising:
   a configuration service configured for carrying out the steps of:
      receiving, from a configuration agent executed by the network device, a request to provide configuration information;
      retrieving a template describing a device configuration, wherein the template comprises symbolic reference to one of a plurality of values of one or more parameters that may be resolved into values specific to a particular device;
      wherein each symbolic reference identifies an operation and a list of parameters for that operation;
      retrieving from a repository of the plurality of values, based on the symbolic references, one or more values of parameters specific to the network device;
      creating and storing a device-specific instance of the configuration information based on the template and the values of parameters specific to said network device and conforming to an Extensible Markup Language Document Type Definition (XML DTD), comprising one or more XML tags that delimit the configuration information, including at least one pair of XML tags that delimit a beginning and an end of the configuration information.

25. An apparatus as recited in claim 24, further comprising:
one or more configuration templates stored in a directory service, wherein each of the configuration templates comprises an object in the directory service that describes a configuration;
one or more container objects stored in the directory service and associated with the network device, each of the container objects comprising values for the one or more parameters in one of the configuration templates that corresponds to the network device.

26. A computer-readable medium carrying one or more sequences of instructions for automatically configuring a network device, which instructions, when executed by one or more processors, cause the one or more processors to carry out the steps of:
receiving a request from the network device to provide configuration information;
retrieving a template describing a device configuration, wherein the template comprises symbolic references to one of a plurality of values of one or more parameters that may be resolved into values specific to a particular device;
wherein each symbolic reference identifies an operation and a list of parameters for that operation;
retrieving from a repository of the plurality of values, based on the symbolic references, one or more values of parameters specific to the network device;
creating and storing a device-specific instance of the configuration information based on the template and the values of parameters specific to said network device and conforming to an Extensible Markup Language Document Type Definition (XML DTD), comprising one or more XML tags that delimit the configuration information, including at least one pair of XML tags that delimit a beginning and an end of the configuration information.

27. An apparatus for automatically configuring a network device, comprising:
means for receiving a request from the network device to provide configuration information;
means for retrieving a template describing a device configuration, wherein the template comprises symbolic references to one of a plurality of values of one or more parameters that may be resolved into values specific to a particular device;
wherein each symbolic reference identifies an operation and a list of parameters for that operation;
means for retrieving from a repository of the plurality of values, based on the symbolic references, one or more values of parameters specific to the network device;
means for creating and storing a device-specific instance of the configuration information based on the template and the values of parameters specific to said network device and conforming to an Extensible Markup Language Document Type Definition (XML DTD), comprising one or more XML tags that delimit the configuration information, including at least one pair of XML tags that delimit a beginning and an end of the configuration information.

28. An apparatus for automatically configuring a network device, comprising:
a network interface that is coupled to a data network for receiving one or more packet flows therefrom;
a processor;
one or more stored sequences of instructions which, when executed by the processor, cause the processor to carry out the steps of:
generating a request to provide configuration information;
retrieving a set of configuration information conforming to an Extensible Markup Language Document Type Definition (XML DTD), the configuration information comprising one or more XML tags that delimit a beginning and an end of the configuration information, based on a template describing a device configuration that is instantiated with one or more values of parameters that are specific to the network device;
wherein the template comprises symbolic references to one of a plurality of values of one or more parameters that may receive values specific to a particular device, wherein each symbolic reference identifies an operation and a list of parameters for that operation;
syntax checking only configuration commands of the set of configuration information to determine whether the configuration commands therein conform to a command language that is understood by the network device; and
applying the configuration information to the network device.

29. An apparatus for automatically configuring a network device, comprising:
a configuration agent executed by the network device and configured for carrying out the steps of:
generating a request to provide configuration information;
receiving a device-specific instance of configuration information based on a template describing a device configuration, wherein the template comprises symbolic references to one of a plurality of values of one or more parameters that may be resolved into values specific to a particular device, and based on one or more values of parameters specific to the device that are retrieved from a repository based on the symbolic references, and wherein the template conforms to an Extensible Markup Language Document Type Definition (XML DTD), comprising one or more XML tags that delimit a beginning and an end of the configuration information, wherein each symbolic reference identifies an operation and a list of parameters for that operation; and
applying the device-specific instance of configuration information to the network device to result in re-configuring the network device in accordance with the template.

30. An apparatus as recited in claim 29, further comprising:
one or more configuration templates stored in a directory service, wherein each of the configuration templates comprises an object in the directory service that describes the device configuration;
one or more container objects stored in the directory service and associated with the network device, each of the container objects comprising values for the one or more parameters in one of the configuration templates that corresponds to the network device.

31. A method of automatically configuring a computer program application that uses information about network devices or topology in order to operate in a network environment, comprising the steps of:

receiving a request for network topology information from the computer program application;

retrieving a template of network topology information from a repository;

wherein the template comprises symbolic references to one of a plurality of values of one or more parameters that may receive values specific to a particular element of the topology;

wherein each symbolic reference identifies an operation and a list of parameters for that operation;

resolving elements for the topology into application-specific values, resulting in creating and storing resolved network topology information; and providing the resolved network topology information to a configuration agent within the application that is configured to re-configure the computer program application to operate with the resolved network topology.

32. A method as recited in claim 31, wherein resolving elements of the topology includes the step of carrying out application-specific syntax checking of elements of the template.

* * * * *